US012755080B2

(12) United States Patent
Goldsmith et al.

(10) Patent No.: US 12,755,080 B2
(45) Date of Patent: Oct. 6, 2026

(54) METHODS AND APPARATUS TO AUTOMATE A DESIGN INCLUDING ROUTING BETWEEN DICE

(71) Applicant: INTEL CORPORATION, Santa Clara, CA (US)

(72) Inventors: Michael Goldsmith, Lake Oswego, OR (US); Prashant Majhi, San Jose, CA (US); Per Sverdrup, Redwood City, CA (US); Chung-Ching Peng, Taipei (TW)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 18/148,963

(22) Filed: Dec. 30, 2022

(65) Prior Publication Data

US 2024/0220699 A1 Jul. 4, 2024

(51) Int. Cl.
*G06F 30/392* (2020.01)
*G06F 30/327* (2020.01)
*G06F 30/3947* (2020.01)
*G06F 30/3953* (2020.01)
*G06F 111/20* (2020.01)
*G06F 119/18* (2020.01)

(52) U.S. Cl.
CPC .......... *G06F 30/392* (2020.01); *G06F 30/327* (2020.01); *G06F 30/3947* (2020.01); *G06F 30/3953* (2020.01); *G06F 2111/20* (2020.01); *G06F 2119/18* (2020.01)

(58) Field of Classification Search
CPC ............... G06F 30/392; G06F 30/3947; G06F 30/3953; G06F 30/327; G06F 2111/20; G06F 2119/18
USPC ...... 716/122, 129, 130, 104, 54, 55; 703/14; 700/98, 118, 121
See application file for complete search history.

(56) References Cited

U.S. PATENT DOCUMENTS

| | | | | |
|---|---|---|---|---|
| 7,982,298 | B1 * | 7/2011 | Kang | H01L 25/03 257/E23.116 |
| 8,832,608 | B1 * | 9/2014 | Chakrabarty | G06F 30/327 716/51 |
| 8,895,440 | B2 * | 11/2014 | Choi | H10P 54/00 438/667 |
| 10,496,777 | B1 * | 12/2019 | Venkatakrishnan | G06F 30/39 |

(Continued)

FOREIGN PATENT DOCUMENTS

| | | | | |
|---|---|---|---|---|
| CN | 101118902 A * | 2/2008 | | |
| EP | 0773586 A2 * | 5/1997 | | H01L 23/49575 |
| WO | WO-2017066079 A1 * | 4/2017 | | H01L 23/5383 |

*Primary Examiner* — Phallaka Kik
(74) *Attorney, Agent, or Firm* — Hanley, Flight & Zimmerman, LLC

(57) ABSTRACT

Methods, apparatus, systems, and articles of manufacture are disclosed including at least one memory; machine-readable instructions; and processor circuitry to at least one of execute or instantiate the machine-readable instructions to: obtain a register-transfer level design defining operations of electrical circuits in first and second dice of a multi-die semiconductor package, the second die to be stacked on the first die in the multi-die semiconductor package; and select placement of a cell for a physical layout for the multi-die semiconductor package based on the register-transfer level design, the cell including a via to electrically interconnect the first die to the second die.

21 Claims, 13 Drawing Sheets

(56) References Cited

U.S. PATENT DOCUMENTS 11,003,827 B1 * 5/2021 Kundarewich ....... G06F 30/347
11,288,222 B1 * 3/2022 Noguera Serra ... G06F 15/7825
12,519,073 B2 * 1/2026 Eid ....................... H10W 70/09
12,622,321 B2 * 5/2026 Lee ....................... H10P 74/207
2009/0065907 A1 * 3/2009 Haba ................. H01L 21/76898 257/621
2011/0204932 A1 * 8/2011 Cortadella ................ G06F 7/00 327/145
2013/0006557 A1 * 1/2013 Chakrabarty .. G01R 31/318538 702/65
2013/0142227 A1 * 6/2013 Ferris .................... G06F 13/423 375/219
2015/0135147 A1 * 5/2015 Emirian ................ G06F 30/347 716/105
2015/0255372 A1 * 9/2015 Kamgaing ............ H01L 23/481 257/532
2016/0148901 A1 * 5/2016 Alvarez-Icaza Rivera .................. G06F 15/803 257/773
2016/0343613 A1 * 11/2016 Uzoh ................ H01L 21/76898
2017/0110407 A1 * 4/2017 Chaware ............. H01L 25/0655
2017/0141079 A1 * 5/2017 Kao .................... H01L 25/0657
2017/0154881 A1 * 6/2017 Shao ....................... H10P 54/00
2017/0179078 A1 * 6/2017 Jung ................... H01L 25/0652
2017/0194291 A1 * 7/2017 Yu ..................... H01L 21/76898
2018/0189233 A1 * 7/2018 Alvarez-Icaza Rivera .................. G06F 15/803
2018/0331070 A1 * 11/2018 Seidemann ......... H01L 25/0657
2019/0083972 A1 * 3/2019 Nielsen .................. B41J 2/1603
2020/0020635 A1 * 1/2020 Chang ................. H01L 25/0657
2020/0126922 A1 * 4/2020 Seidemann ......... H01L 23/5387
2020/0185300 A1 * 6/2020 Xu .......................... H01L 23/36
2020/0212012 A1 * 7/2020 Meyers ................. H01L 21/568
2021/0098380 A1 * 4/2021 Chen ..................... H01L 25/117
2021/0305163 A1 * 9/2021 Akkinepally ........... H01L 24/19
2022/0013505 A1 * 1/2022 Sethuraman ............ H01L 23/34
2022/0139850 A1 * 5/2022 Gutierrez, III .... H01L 23/49822 257/724
2022/0199570 A1 * 6/2022 Milton ................. B23K 20/007
2022/0302080 A1 * 9/2022 Ali ........................ H10W 90/00
2022/0374580 A1 * 11/2022 Weng .................. G06F 30/3947
2023/0098957 A1 * 3/2023 Eid ......................... H01L 24/19 257/691
2023/0207546 A1 * 6/2023 Alam ...................... H01L 25/18
2024/0143883 A1 * 5/2024 Luo ....................... G06F 30/392
2025/0173309 A1 * 5/2025 Abts ....................... G06F 15/80
2025/0344511 A1 * 11/2025 Arkali Radhakrishna .................. H10D 89/10
2025/0385187 A1 * 12/2025 Ramzan .............. H10W 70/611
2026/0018566 A1 * 1/2026 Seidemann ........... H10W 90/00

* cited by examiner

METHODS AND APPARATUS TO AUTOMATE A DESIGN INCLUDING ROUTING BETWEEN DICE

FIELD OF THE DISCLOSURE

This disclosure relates generally to electronic design automation and, more particularly, to methods and apparatus to automate a design including routing between dice.

BACKGROUND

As integrated circuitry becomes increasingly complex, designers are incentivized to automate designing of semiconductor packages from abstractions of electronic designs. In recent years, development of electronic design automation (EDA) tools have automated generation of relatively complex semiconductor packages from relatively less complex register-transfer level (RTL) designs. Traditionally, an EDA tool selects, places, and routes a plurality of cell circuitry that are represented by multiple cells of a cell library. The EDA tool selects cells that, when implemented as cell circuitry, perform one or more operations of the RTL design The cell library includes a plurality of pre-defined cells, each of which include descriptions that allows the EDA tool to implement the cell in a semiconductor design as cell circuitry. By creating comprehensive cell libraries, EDA tools may design increasingly complex semiconductor packages, which are capable of being manufactured, from relatively less complex RTL designs.

Figure 1:
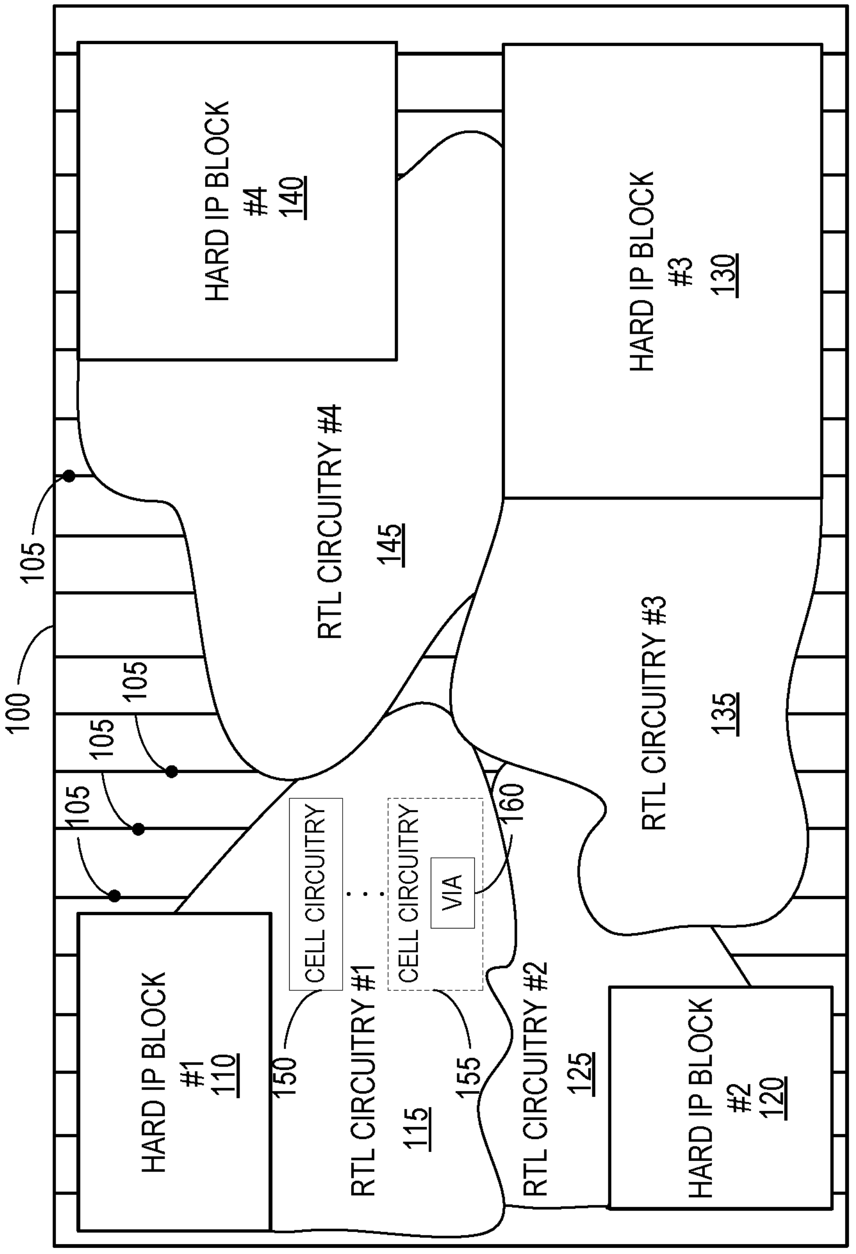
FIG. 1 is a schematic illustration of an example design of a die including circuitry that electronic design automation circuitry picks, places, and routes to implement a register-transfer level design.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Electronic design automation (EDA) tools design semiconductor packages based on a register-transfer level (RTL) design and hard intellectual property (IP) blocks. An EDA tool automates a process of selecting, placing, and routing of circuitry within a design of a semiconductor package. Designing a semiconductor package begins with developing and/or selecting hard IP blocks that perform a high-level function of the semiconductor package. For example, a designer may add a first hard IP block to a package that operates as a level 2 (L2) cache to support processor circuitry, such as a central processing unit (CPU), which corresponds to a second hard IP block. The EDA tool views both sizes and locations of hard IP blocks as constraints by the designer. Following the designer adding a hard IP block to a semiconductor package, the EDA tool may begin to place circuitry in portions of the design of the semiconductor package that are outside of the constraints of the hard IP blocks based on an RTL design.

Designers create RTL designs to represent operations between hard IP blocks. RTL designs are abstract specifications of desired behavior of circuitry. Typically, RTL designs are created using a hardware description language (HDL), such as Verilog, system Verilog, very high-speed integrated circuitry hardware description language (VHSIC or VHDL), etc. Alternatively, designers may create a relatively higher-level abstraction of an RTL design using a programming language, such as C, C++, C#, etc. In such an example, designers may use a converter, a compiler, and/or a synthesis tool to obtain the RTL design from the relatively higher-level abstraction.

EDA tools obtain RTL designs to synthesize circuitry capable of performing operations of the RTL designs. For example, an EDA tool may generate a net list of circuitry components (e.g., a buffer, an inverter, an amplifier, a flip-flop, etc.) that when integrated, operate in a manner described in an RTL design. The EDA tool selects cells from a cell library to implement the synthesized circuitry in the semiconductor package. The cell library includes a plurality of cells that are characterized by both physical characteristics (e.g., size, silicon design, etc.) and electrical characteristics (e.g., input requirements, output requirements, signal to noise ratio (SNR) specification, etc.). The EDA tool may use one or more cells to generate cell circuitry capable of performing operations of the synthesized circuitry. The EDA tool may select additional cells to support and/or mitigate the electrical characteristics of a cell and/or electrical characteristics of routes between cells. For example, an EDA tool may select a first cell representing a buffer to ensure a sufficient drive strength of a clock signal at an input of a second cell.

The EDA tool places and routes cell circuitry of selected cells into a die of the semiconductor package to implement the RTL design. In some examples, the EDA tool may be unable to place and route the cells needed to implement the RTL design. In such an example, a designer may modify a location and/or size of one or more hard IP blocks in an attempt to enable the EDA tool to successfully implement the RTL design.

As semiconductor manufacturing technologies continue to advance, complex design techniques are becoming easier and cheaper to manufacture. One such complex design technique is a method of creating a semiconductor package using multiple stacked dice. Such a method allows designers to include a first hard IP block on a first die of a first thickness and a second hard IP block on a second die of a second thickness. The first thickness may be an optimal thickness for the first hard IP block, while the second hard IP block may need to be adapted to be implemented using the first thickness. Similarly, the second thickness may be an optimal thickness for the second hard IP block, while the first hard IP block may need to be adapted to be implemented using the second thickness. Including multiple dice in a semiconductor package allows designers to use optimal configurations of hard IP blocks and minimize time needed to adapt hard IP blocks.

Designers use vias to electrically couple different dice. Similar to hard IP blocks, designers place the vias in a die of a design of a semiconductor package. EDA tools view the size and location of the vias as constraints from the designer. Additionally, the location and electrical characteristics of the vias may require additional cells to mitigate electrical characteristics.

The examples described herein include methods and apparatus to automate designs including routing between multiple dice using EDA circuitry. In some described examples, the EDA circuitry determines, using an RTL design, whether to select, place, and route a via in a design of a semiconductor package. The EDA circuitry mitigates electrical characteristics of the via by selecting, placing, and routing at least one of an additional via, and/or additional cell elements. For example, the EDA circuitry mitigates a relatively high resistance of a first via, by selecting, placing, and routing a second via in parallel to the first via. In another example, the EDA circuitry mitigates a relatively long route resulting from a via by selecting, placing, and routing cell circuitry of a cell corresponding to buffer circuitry to increase drive strength of a signal.

FIG. 1 is a schematic illustration of a physical layout of an example die design 100. In the example of FIG. 1, the die design 100 includes example electrical traces 105, a first example hard IP block 110, first example RTL circuitry 115, a second example hard IP block 120, second example RTL circuitry 125, a third example hard IP block 130, third example RTL circuitry 135, a fourth example hard IP block 140, and fourth example RTL circuitry 145. The die design 100 illustrates sizes and locations of the hard IP blocks 110, 120, 130, and 140, as selected and placed by a designer. The die design 100 illustrates sizes and locations of the RTL circuitry 115, 125, 135, and 145, as selected and placed by EDA circuitry. The EDA circuitry selects, places, and routes the RTL circuitry 115, 125, 135, and 145 in the die design 100 based on an obtained RTL design.

In the example of FIG. 1, the electrical traces 105 are vertical electrical lines (e.g., conductive traces, wires, etc.). Alternatively, the electrical traces 105 may be horizontal electrical lines, and/or a combination of both vertical and horizontal electrical lines. EDA circuitry may configure one or more of the electrical traces 105 to electrically couple one or more of the hard IP blocks 110, 120, 130, or 140 and/or one or more of the RTL circuitries 115, 125, 135, or 145. For example, one of the electrical traces 105 may couple the first hard IP block 110 and the second hard IP block 120 to a common potential (e.g., ground). The electrical traces 105 allow EDA circuitry to supply signals to and from the hard IP blocks 110, 120, 130, and/or 140 and the RTL circuitry 115, 125, 135, and/or 145.

The hard IP blocks 110, 120, 130, and 140 are relatively high-level block representations of circuitry configured to perform a pre-determined operation. For example, the first hard IP block 110 may be a block representation of memory circuitry for a digital signal processor, which may be represented by the fourth hard IP block 140. The hard IP blocks 110, 120, 130, and 140 may include circuitry protected by a patent, provided by a customer, etc. A size and a location of the hard IP blocks 110, 120, 130, and 140 constrain placement of the RTL circuitry 115, 125, 135, and 145. The size and the location of the hard IP block 110, 120, 130, and 140 are set by a designer prior to EDA circuitry placing and routing the RTL circuitry 115, 125, 135, and 145.

The first hard IP block 110 is coupled to the first RTL circuitry 115. The second hard IP block 120 is coupled to the second RTL circuitry 125. The third hard IP block 130 is coupled to the third RTL circuitry 135. The fourth hard IP block 140 is coupled to the fourth RTL circuitry 145. The electrical traces 105 may couple the RTL circuitry 115, 125, 135, and/or 145 together. The electrical traces 105 may couple the hard IP blocks 110, 120, 130, and/or 140 to the RTL circuitry 115, 125, 135, and/or 145.

A register-transfer level design defining operations of electrical circuitry uses a plurality of operations on inputs and/or outputs of the hard IP blocks 110, 120, 130, and 140. The RTL circuitry 115, 125, 135, and 145 represent regions of the die design 100 including circuitry which the EDA circuitry picks, places, and routes to perform the operations of the RTL design. The EDA circuitry constructs the RTL circuitry 115, 125, 135, and 145 by picking cells from a cell library. A cell of the cell library represents cell circuitry as a semiconductor implementation of the cell. The cell library includes a plurality of cells which are accessible based on electrical and/or physical characteristics. For example, the EDA circuitry may select a cell from the cell library based on an operation of the cell being to buffer an input signal and a physical characteristic corresponding to a thickness of the die design 100. The RTL circuitry 115, 125, 135, and 145 include cell circuitry which implements the operations of the RTL design.

In the example of FIG. 1, the first RTL circuitry 115 includes first example cell circuitry 150, second example cell circuitry 155, and an example multi-die via (VIA) 160. The first cell circuitry 150 corresponds to a semiconductor implementation of a cell of a cell library, which performs a first operation of the RTL design. For example, the first cell circuitry 150 may be one of a flip-flop, a multiplexer, an amplifier, a buffer, an inverter, a logic gate (e.g., AND gate, OR gate, NOR gate, etc.), etc. EDA circuitry selects the first cell circuitry 150 from a cell library based on considerations including operation, characteristics, etc. For example, EDA circuitry selects a cell corresponding to a D-flip-flop to latch a data input on a rising edge of a clock input to achieve a synchronization operation of the RTL design. In such an example, the synchronization operation synchronizes the data input to rising edges of a clock signal coupled to the clock input. Additional examples of cell selection from the cell library are discussed in connection with FIG. 3, below.

The second cell circuitry 155 corresponds to circuitry to perform a second operation of the RTL design and the first hard IP block 110. The second cell circuitry 155 includes the multi-die via 160. The multi-die via 160 is an electrical trace that couples the die design 100 to a different die layer. For example, the second cell circuitry 155 may couple an output of supplemental RTL circuitry, which is implemented on a different die layer, to an input of the first RTL circuitry 115. In another example, the second cell circuitry 155 may couple an input of supplemental RTL circuitry, which is implemented on a different die layer, to an output of the first RTL circuitry 115. The multi-die via 160 may be a through silicon via, a through dielectric via, or a pillar. Similar to Examples of the multi-die via 160 are illustrated and discussed further in connection with FIG. 2, below.

Similar to the first RTL circuitry 115, the RTL circuitry 125, 135, and 145 include a plurality of cell circuitry, which is not illustrated for simplicity. Similar to the cell circuitry 150 and 155, EDA circuitry picks, places, and routes the cell circuitry of the RTL circuitry 125, 135, and 145

Figure 2:
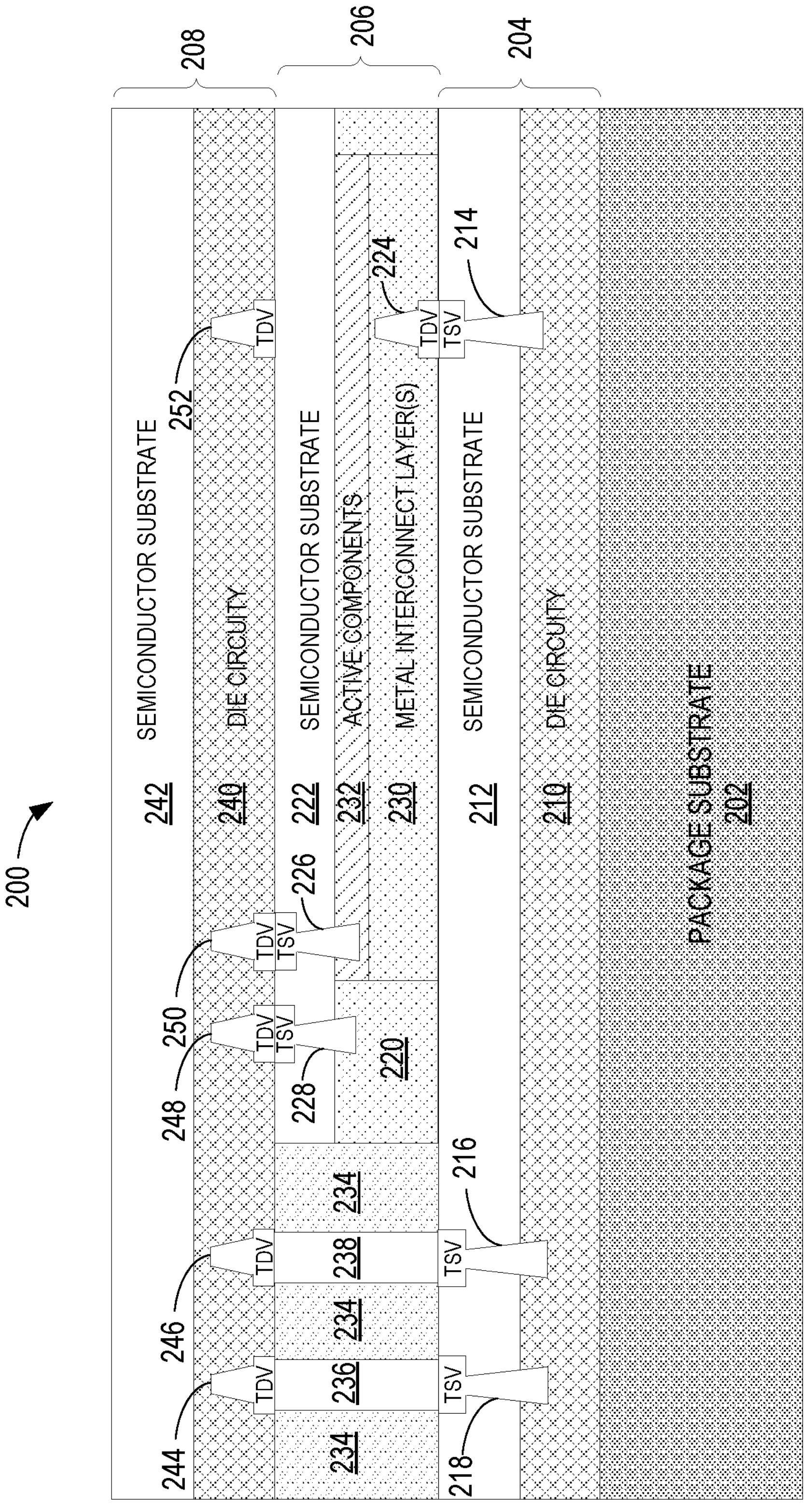
FIG. 2 is a schematic illustration of an example multi-die semiconductor package including a plurality of dice electrically coupled by through dielectric vias, through silicon vias, and/or through mold vias.

FIG. 2 is a schematic illustration of an example multi-die semiconductor package 200 including a plurality of die layers that are electrically coupled by a plurality of multi-die vias. In the example of FIG. 2, the multi-die semiconductor package 200 includes an example package substrate 202, a first example die layer 204, a second example die layer 206, and a third example die layer 208. EDA circuitry picks, places, and routes multi-die vias to electrically couple the die layers 204-208.

The package substrate 202 is a layer of insulating material which protects, seals, and/or isolates, sensitive portions of the multi-die semiconductor package 200. For example, the package substrate 202 may be made of a ceramic compound. A thickness of the package substrate 202 may vary based on the multi-die semiconductor package 200. In some examples, the package substrate 202 is relatively thick to protect traces coupled to sensitive signals from interference and/or prevent relatively high-power circuitry from interfering with circuitry of other semiconductor packages. The material and thickness of the package substrate 202 is determined and configured by a designer, prior to and/or after operations of EDA circuitry.

The first die layer 204 includes a first example die circuitry layer 210, a first example semiconductor substrate layer 212, a first example TSV 214, a second example TSV 216, and a third example TSV 218. The first die layer 204 is electrically coupled to the die layers 206 and 208 by the TSVs 214-218.

The first die circuitry layer 210 is coupled between the package substrate 202 and the first semiconductor substrate layer 212. The first die circuitry layer 210 is a portion of the first die layer 204 that includes semiconductor implementations of cell circuitry and metal layers which electrically couple the cell circuitry. Further detail of the cell circuitry and metal layers are discussed in connection with the second die layer 206, below.

The first die circuitry layer 210 includes implementations of both hard IP blocks (e.g., the hard IP blocks 110, 120, 130. And 140 of FIG. 1) and RTL circuitry (e.g., the RTL circuitry 115, 125, 135, and 145 of FIG. 1). Accordingly, the first die circuitry layer 210 is generated at least in part by the EDA circuitry.

The first semiconductor substrate layer 212 is coupled between the second die layer 206 and the first die circuitry layer 210. The first semiconductor substrate layer 212 is a substrate material, typically silicon, that the first die circuitry layer 210 is constructed on. For example, the first semiconductor substrate layer 212 may be a silicon wafer which acts as a base for manufacturing the first die circuitry layer 210. Although in the example of FIG. 2, the first die circuitry layer 210 is illustrated below the first semiconductor substrate layer 212, the first die layer 204 may be rotated and/or flipped, placing the first die circuitry layer 210 between the package substrate 202 and the second die layer 206. In such an orientation, the TSVs 214-218 may be replaced with solder bumps, TDVs, mounting pads, etc.

The TSVs 214-218 electrically couple portions of the first die circuitry layer 210 to the die layers 206 and 208. The TSVs 214-218 create electrical routes through the first semiconductor substrate layer 212. The first TSV 214 electrically couples the first die layer 204 to the second die layer 206. For example, the first TSV 214 may route a signal from cell circuitry of the first die circuitry layer 210 to the second die layer 206.

The TSVs 216 and 218 electrically couple the first die circuitry layer 210 to the third die layer 208. Unlike the first TSV 214, which couples the die layers 204 and 206, the TSVs 216 and 218 both connect a common node of the first die circuitry layer 210 to the third die layer 208. For example, the TSVs 216 and 218 both route a clock signal of the first die circuitry layer 210 to a singular point of the third die layer 208. Such a configuration of the TSVs 216 and 218 may be referred to as being connected in parallel.

EDA circuitry may select, place, and route the TSVs 216 and 218 to create a laddering effect, which reduces a resistance of the route. The laddering effect uses a concept that coupling a plurality of resistances in parallel, between two points, reduces an effective resistance opposed to a single resistance between the two points. For example, coupling two one-hundred Ohm (Ω) resistances in parallel between a first point and a second point creates an effective resistance equal to fifty Ohms. In the example of FIG. 2, the EDA circuitry selects, places, and routes the third TSV 218 to reduce a resistance of the second TSV 216. Such an addition of a parallel TSV is one method of mitigating effects resulting from a use of multi-die vias (such as the TSVs 216 and 218). Additional considerations and/or methods may be used in accordance with the teachings disclosed herein to mitigate effects of adding multi-die vias.

The second die layer 206 includes a second example die circuitry layer 220, a second example semiconductor substrate layer 222, a first example TDV 224, a fourth example TSV 226, and a fifth example TSV 228. The second die layer 206 is electrically coupled to the first die layer 204 by the first TDV 224. The second die layer 206 is electrically coupled to the third die layer 208 by the TSVs 226 and 228.

The second die circuitry layer 220 is coupled between the first semiconductor substrate layer 212 of the first die layer 204 and the second semiconductor substrate layer 222. Such a configuration of the die layers 204 and 206 is referred to as a face-to-back transition. The face-to-back transition of the die layers 204 and 206 refers to a face of the second die layer 206, the second die circuitry layer 220, coupled to a back of the first die layer 204, the first semiconductor substrate layer 212. Alternatively, a face-to-back transition may refer to a face of the first die layer 204, the first die circuitry layer 210, being coupled to a back of the second die layer 206, the second semiconductor substrate layer 222.

In an alternate configuration, the die layers 204 and 206 may be coupled to form a face-to-face transition. In such an alternate configuration, the face of the first die layer 204, the first die circuitry layer 210, is coupled to the face of the second die layer 206, the second die circuitry layer 220.

In yet another alternate configuration, the die layers 204 and 206 may be coupled to form a back-to-back transition. In such an alternate configuration, the back of the first die layer 204, the first semiconductor substrate layer 212, is coupled to the back of the second die layer 206, the second semiconductor substrate layer 222. Transitions between the die layers 204-208 may be selected by a designer prior to the EDA tool selecting, placing, and routing RTL circuitry.

In the example of FIG. 2, the die layers 204-208 include a face side, being a first side corresponding to the die circuitry layers 210, 220, and 240, and a back side, being a second side corresponding to the substrate layers 212, 222, and 242. In alternative embodiments, a die layer may include multiple die circuitry layers, such as one on each side of a substrate layer. In some such examples, both sides of the die layer may be considered face sides. Accordingly, a via may be placed to electrically couple the multiple die circuitry layers. In another alternative embodiment, a die layer may include multiple substrate layers, such as one on each side of a die circuitry layer. In some such examples, both sides of the die layer may be considered back sides. Accordingly, vias may be placed on both sides of the die circuitry layer.

Although the example of FIG. 2, illustrates face-to-back transitions between die layers, other transitions (i.e., face-to-face, back-to-back, etc.) and/or alternate die layers (i.e., die layers with two faces, die layers with two backs) may be used in accordance with the teachings disclosed herein.

The second die circuitry layer 220 includes an example metal interconnect layer 230 and example active component layer 232. EDA circuitry constructs portions of the layers 230 and 232 to place and route cell circuitry to implement an RTL design.

The metal interconnect layer 230 is a region of the second die circuitry layer 220 consisting of stacks of metal traces that electrically couple portions of the active component layer 232 together and/or to a multi-die via(s). For example, the metal interconnect layer 230 couples the first TDV 224 to one or more portions of the active components layer 232. The electrical traces 105 of FIG. 1 illustrate example traces which may be implemented in the metal interconnect layer 230.

The active components layer 232 includes semiconductor implementations of cell circuitry that perform operations of the hard IP blocks and/or an RTL design. The metal interconnect layer 230 electrically couple portions of the active components layer 232. The active components layer 232 may be constructed using cell circuitry information included in cells of a cell library. Examples cells are discussed in further detail in connection with FIG. 3, below.

The second semiconductor substrate layer 222 is configured similar to the first semiconductor substrate layer 212.

The first TDV 224 electrically couples the first die layer 204 to the layers 230 and/or 232. In the example of FIG. 2, EDA circuitry may place the first TDV 224 based on a location of the first TSV 214 in the first die layer 204. For example, the EDA circuitry places the first TDV 224 using a placement of the first TSV 214 in the first die layer 204 when the EDA circuitry has previously placed and/or routed the first TSV 214. In another example, the EDA circuitry places the first TSV 214 using a placement of the first TDV 224 in the second die layer 206 when the EDA circuitry has previously placed and/or routed the first TDV 224.

The TSVs 228 and 226 are configured similar to the TSVs 216 and 218. The TSVs 228 and 226 electrically couple the layers 230 and/or 232 of the second die circuitry 220 to the third die layer 208.

In the example of FIG. 2, the second die layer 206 is placed next to an example mold region 234. The mold region 234 is placed next to the second die layer 204 and between the die layers 204 and 208. The mold region 234 includes a first example pillar 236 and a second example pillar 238. The mold region 234 allows the first die layer 204 to be electrically coupled to the third die layer 208 without a need to route through the second die layer 204. The mold region 234 is manufactured using an insulating material, such as a polymer.

The pillars 236 and 238 are example through mold vias. The pillars 236 and 238 electrically couple the die layers 204 and 208. The pillars 236 and 238 may be constructed by filling paths, cut in the mold region 234, with a conductive material, such as copper, gold, etc. Although the pillars 236 and 238 couple the die layers 204 and 208 next to the second die layer 206, the pillars 236 and 238 may be modified to couple die layers separated by a plurality of die layers.

The third die layer 208 includes a third example die circuitry layer 240, a third example semiconductor substrate layer 242, a second example TDV 244, a third example TDV 246, a fourth example TDV 248, a fifth example TDV 250, and a sixth example TDV 252. The third die layer 208 is electrically coupled to the first die layer 204 by the TDVs 244 and 246. The third die layer 208 is electrically coupled to the second die layer 206 by the TDVs 248 and 250.

The third die circuitry layer 240 is configured similar to the die circuitry layers 210 and 220. The third semiconductor substrate layer 242 is configured similar to the semiconductor substrate layers 212 and 222.

The TDVs 244 and 246 electrically couple the first die layer 204 to the third die circuitry layer 240. The first die layer 204 is coupled to the third die circuitry layer 240 by a first route including the TSVs 216 and 218, the pillars 236 and 238, and the TDVs 244 and 246. The first die layer 204 may alternatively be coupled to the third die circuitry layer 240 by a second route including the first TSV 214, the first TDV 224, a portion of the metal interconnect layers 230, the TSVs 226 and 228, and the TDVs 248 and 250. EDA circuitry may electrically couple die circuitry that is separated by one or more die layers by creating the first path, which uses mold regions and pillars, or by creating the second path, which uses the metal interconnect layers.

The TDVs 248 and 250 electrically couple the third die circuitry layer 240 to the second die layer 204. Similar to the first TDV 224, placement of the TDVs 248 and 250 depend on a placement of the TSVs 226 and 228 and vice versa. EDA circuitry may modify placement of one or more of the TSVs 226 and/or 228 when routing the TSVs 226 and 228 to the TDVs 248 and 250 is not possible and/or creates electrical effects that may not be mitigated.

Figure 3:
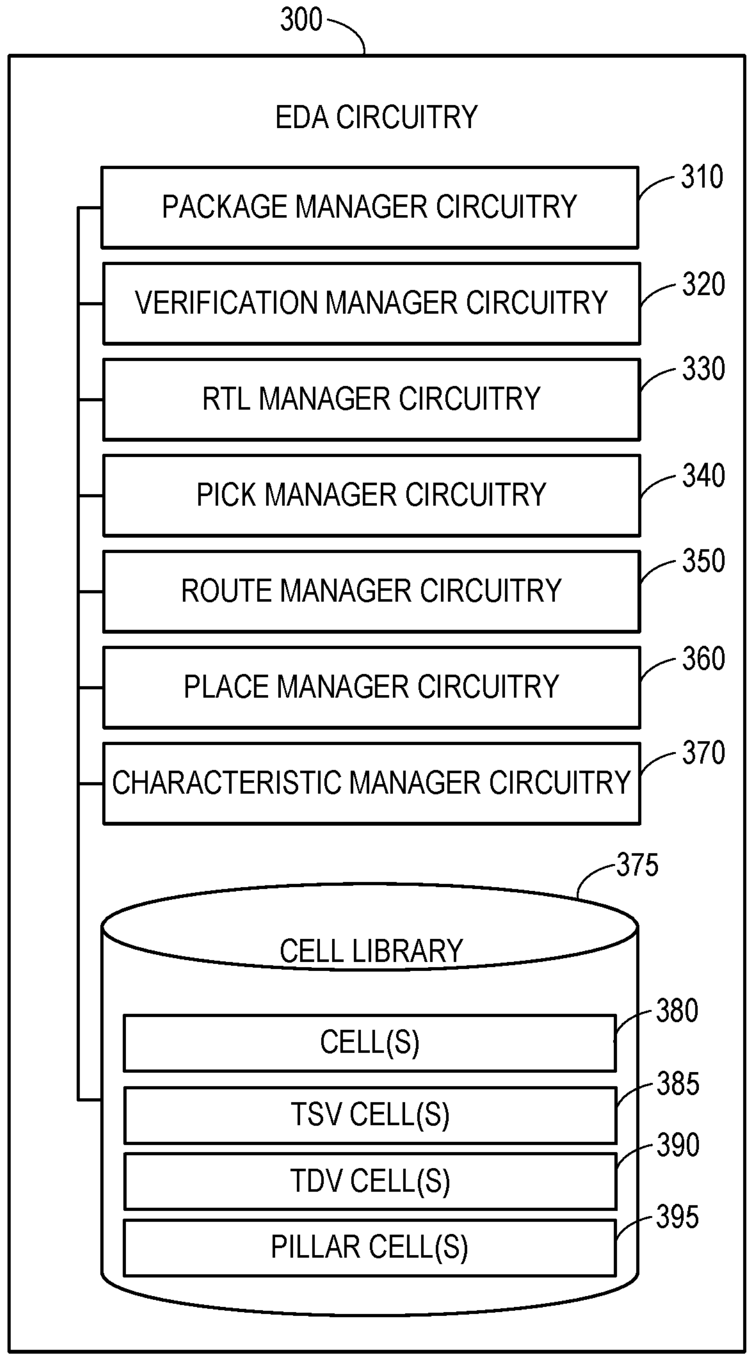
FIG. 3 is a block diagram of example electronic design automation circuitry configured to select cells from a cell library, place cell circuitry representative of the selected cells, and generate routes to couple the cell circuitry, the generated routes including routes between multiple dice.

FIG. 3 is a block diagram of example EDA circuitry 300 to automate electronic design of a semiconductor package including multiple dice, such as the multi-die semiconductor package 200 of FIG. 2. The EDA circuitry 300 of FIG. 3 may be instantiated (e.g., creating an instance of, bring into being for any length of time, materialize, implement, etc.) by processor circuitry such as a central processing unit executing instructions. Additionally or alternatively, the EDA circuitry 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the EDA circuitry 300 of FIG. 3 may be implemented by microprocessor circuitry executing instructions to cause processor circuitry of FIG. 9 to implement one or more virtual machines and/or containers.

In the example of FIG. 3, the EDA circuitry 300 includes example package manager circuitry 310, example verification manager circuitry 320, example RTL manager circuitry 330, example pick manager circuitry 340, example route manager circuitry 350, example place manager circuitry 360, example characteristic manager circuitry 370, and an example cell library 375. In the example of FIG. 3, the cell library 375 further includes example cells 380, example TSV cells 385, example TDV cells 390, and example pillar cells 395. The EDA circuitry 300 designs a semiconductor package by picking, placing, and routing cell circuitry of cells 380-395 comprising the cell library 375.

The package manager circuitry 310 is configured to monitor, modify, update, and set characteristics of the semiconductor package as the EDA circuitry 300 designs the semiconductor package. The package manager circuitry 310 allows for information about the semiconductor package to be modified by a designer, processor circuitry, the circuitry 320-370, etc. For example, the package manager circuitry 310 may receive inputs from the designer to add one or more die layers to a package. In such an example, the package manager circuitry 310 may receive properties of each die, such as size, thickness, composition, etc. In another example, the package manager circuitry 310 selects the properties of a semiconductor package based on default selections, predetermined templates, contextual information about circuitry to be implemented, etc. In yet another example, the package manager circuitry 310 modifies the properties as the characteristic manager circuitry 370 determines characteristics of cell circuitry.

The information about the semiconductor package enables the package manager circuitry 310 to determine transitions between dice. For example, the package manager circuitry 310 determines a face-to-back transition between a first die and a second die when a semiconductor substrate layer (e.g., the semiconductor substrate layers 212, 222, 242 of FIG. 2) of the first die is coupled to the die circuitry layer (e.g., the die circuitry layers 210, 220, and 240 of FIG. 2) of the second die. Alternate transitions between dice are described, above, in connection with FIG. 2.

The package manager circuitry 310 updates the semiconductor package to reflect processes of picking, placing, and routing of cell circuitry. For example, the package manager circuitry 310 may update a visual display, which illustrates a physical layout of one or more dice of the semiconductor packager, similar to the illustration of FIG. 1. In another example, the package manager prevents the place manager circuitry 360 from placing cell circuitry in portions of a die layer that already have cell circuitry placed.

The package manager circuitry 310 tracks a process of designing each die layer comprising the semiconductor package. The package manager circuitry 310 determines which die to design based on the information about the semiconductor package and/or updates to the semiconductor package. For example, the route manager circuitry 350 may supply route information to the package manager circuitry 310 to verify the route may be used. In such an example, the package manager circuitry 310 compares placement of the route to placement information of cell circuitry to determine if the route may be used. In another example, the pick manager 340 creates an instance of cell circuitry in the package manager circuitry 310 to store a semiconductor implementation of a cell. In such an example, the place manager circuitry 360 adds placement information to the instance of the cell circuitry.

In some examples, the package manager circuitry 310 may determine to design multiple dice using one or more instances of computing resources, such as separate compute cores, computers, network distributed processors, etc. In some examples, the package manager circuitry 310 is instantiated by processor circuitry executing route manager instructions and/or configured to perform operations such as those represented by the flowcharts of FIGS. 4-8.

The verification manager circuitry 320 compares characteristics of cell circuitry to design specifications and/or previously designed circuitry. In some examples, the verification manager circuitry 320 derives characteristics of cell circuitry using information of the cell. The verification manager circuitry 320 determines if input and/or output characteristics of cell circuitry results in a need for additional cell circuitry. For example, the verification manager circuitry 320 may determine that additional cell circuitry is required by comparing output characteristics of previously picked, placed, and routed cell circuitry to input characteristics of cell circuitry that is being verified. In such an example, the verification manager circuitry 320 may prevent cell circuitry from being placed and routed based on such a comparison.

The verification manager circuitry 320 may include a plurality of considerations to increase an accuracy of comparisons between characteristics of cells. For example, the verification manager circuitry 320 considers a placement of cell circuitry as not meeting a design specification when the placement is in an area that is bound by a hard IP block (e.g., the hard IP blocks 110, 120, 130, and 140 of FIG. 1) and/or bound by already placed cell circuitry.

The verification manager circuitry 320 includes considerations for characteristics of routing between components. The considerations for routing between components may include resistance of the trace, parasitic capacitances between components, signal strength, etc. The verification manager circuitry 320 includes considerations for traces between dice. For example, the verification manager circuitry 320 may determine that a combination of a TSV (e.g., the TSVs 214, 218, 216, 226, and 228 of FIG. 2) and a TDV (e.g., the TDVs 224, 244, 246, 248, 250, and 252 of FIG. 2) creates a relatively high resistance. In such an example, the verification manager circuitry 320 may determine to add additional vias to reduce the relatively high resistance. Such a consideration uses the laddering effect to reduce resistance.

In some examples, the verification manager circuitry 320 is instantiated by processor circuitry executing route manager instructions and/or configured to perform operations such as those represented by the flowcharts of FIGS. 4-8.

The RTL manager circuitry 330 controls design and implementation of RTL circuitry (e.g., the RTL circuitry 115, 125, 135, and 145 of FIG. 1). The RTL manager circuitry 330 synthesizes an RTL design to determine operations of the RTL design and/or components to implement the RTL design. For example, the RTL manager circuitry 330 may synthesize a netlist of components which represent operations of an RTL design. In other examples, the RTL manager circuitry 330 may synthesize a list of logical operations that implement the RTL design. In other examples, the RTL manager circuitry 330 may need to synthesize an RTL design from a relatively higher-level abstraction, such as a C program, C++ program, etc. The RTL manager circuitry 330 synthesizes the RTL design by generating a list of operations that, when implemented, cause circuitry to execute, perform, and/or instantiate operations of the RTL design.

The RTL manager circuitry 330 synthesizes operational context corresponding to the list of operations. The operational context includes information that identifies how operations will be electrically coupled. For example, the RTL manager circuitry 330 includes information regarding which die layer an input of an operation is coupled to, and which die layer an output of the operation is to be coupled to. In another example the operational context includes information identifying placement constraints, such as associating operations with a specific hard IP block. In yet another example, the operational context may specify a specific cell of the cells 380 to implement the operation.

The RTL manager circuitry 330 may use the list of operations to track which operations have been implemented in a design. For example, the RTL design may track which designs the operations have been implemented. In some examples, the RTL manager circuitry 330 is instantiated by processor circuitry executing RTL manager instructions and/or configured to perform operations such as those represented by the flowcharts of FIGS. 4-8.

The pick manager circuitry 340 picks cell circuitry from the cell library 275 to implement operations of the RTL design. The pick manager circuitry 340 selects one or more of the cells 380-395 from the cell library 375 based on an operation of the RTL design and/or design considerations. The pick manager circuitry 340 selects a cell that includes information to implement the cell as cell circuitry capable of performing an operation. For example, the RTL manager circuitry 330 supplies an operation and/or operational context from an RTL design to the pick manager circuitry 340 to provide context for cell selection.

The pick manager circuitry 340 may determine further design considerations by accessing verification information from the verification manager circuitry 320 and/or characteristics from the characteristic manager circuitry 370. For example, the pick manager circuitry 340 may pick one of the via cells 385 or 390 based on a determination, by the verification manager circuitry 320, that another via is needed. In such an example, the pick manager circuitry 340 may determine a transition between the dice from the package manager circuitry 310 to determine whether to use a TSV or a TDV on each die layer. The pick manager circuitry 340 uses the design considerations to select between multiple cells that perform the same or substantially similar operations.

The pick manager circuitry 340 may further consider information specific to the die layer in which the cell is to be placed. For example, the pick manager circuitry 340 may pick a cell based on the cell circuitry being optimized for a certain semiconductor thickness that matches the thickness of the die layer. In some examples, the package manager circuitry 310 provides die specific characteristics, such as thickness and composition, to the pick manager circuitry 340.

The pick manager circuitry 340 may pick one or more of the cells 380-395 to implement any single operation of the RTL design. Alternatively, the pick manager circuitry 340 may pick a cell which includes references to a plurality of other cells. In some examples, the pick manager circuitry 340 is instantiated by processor circuitry executing constraint manager instructions and/or configured to perform operations such as those represented by the flowcharts of FIGS. 4-8.

The route manager circuitry 350 determines and/or generates electrical traces between cell circuitry based on a placement of cell circuitry decided by the place manager circuitry 360. The route manager circuitry 350 couples cell circuitry on a single die using interconnects, metal layers, electrical traces, etc. The route manager circuitry 350 may couple cell circuitry across dice using one or more vias. The route manager circuitry 350 determines whether a via on a different die layer corresponds to an electrical trace of the die layer being designed. For example, the route manager circuitry 350 determines that a TSV on a first die is to be coupled to a TDV on a second die as a result of determining the route between cell circuitry of the first die and cell circuitry of the second die.

The route manager circuitry 350 routes between first cell circuitry and second cell circuitry based on placement information from the place manager circuitry 360 and operational context from the RTL manager circuitry 330.

In some examples, the route manager circuitry 350 is instantiated by processor circuitry executing pick manager instructions and/or configured to perform operations such as those represented by the flowcharts of FIG. 4-8.

The place manager circuitry 360 determines a location to place cell circuitry in the semiconductor package. The place manager circuitry 360 confirms placement of cell circuitry by verifying the location does not correspond to placement of another cell. Such a verification may be implemented by the package manager circuitry 310 and/or the verification manager circuitry 320. The place manager circuitry 360 may use operational context to determine placement information based on which cell circuitry is to be coupled to the cell circuitry being placed. For example, the place manager circuitry 360 may place an input of first cell circuitry as close to an output of second cell circuitry to minimize a distance between cell circuitry. In another example, the place manager circuitry 360 uses an optimization process to re-arrange placement of cell circuitry to determine placement that minimizes SoC size.

The place manager circuitry 360 places cell circuitry of a multi die cell, such as the cells 385-395, based on already placed cell circuitry of another die. For example, the place manager circuitry 360 places a TSV in a first die based on a location of a TDV in a second die, when a route begins at first cell circuitry, passes through the TSV and the TDV to reach a second cell. In such an example, the route manager circuitry 350 may use a metal layer and/or electrical trace.

In some examples, the place manager circuitry 360 is instantiated by processor circuitry executing verification manager instructions and/or configured to perform operations such as those represented by the flowcharts of FIGS. 4-8.

The characteristic manager circuitry 370 characterizes cell circuitry using information included in the cell library 375 and properties of an implementation of the cell circuitry. For example, the characteristic manager circuitry 370 accesses input and/or output characteristics of cell circuitry of a cell using information included in the cells 380-395. In another example, the characteristic manager circuitry 370 may derive input and/or output characteristics of cell circuitry based on placement in the semiconductor package. In such an example, the characteristic manager circuitry 370 may modify characteristics of cell circuitry based on proximity power domain, predicted noise, interference of relatively close components, clocking speed, etc.

The characteristics manager circuitry 370 supplies the characteristics to the package manager circuitry 310 to determine if the cell circuitry meets specifications. In some examples, the characteristic manager circuitry 370 is instantiated by processor circuitry executing verification manager instructions and/or configured to perform operations such as those represented by the flowcharts of FIGS. 4-8.

The cell library 375 includes the cells 380, the TSV cells 385, the TDV cells 390, and the pillar cells 395. The cell library 375 may be a look up table. The cell library 375 is a collection of the cells 380-395 that include information to construct cell circuitry and derive characteristics of the cell circuitry. The TSVs 214, 216, 218, 226, and 228 of FIG. 2 are example implementations of the TSV cells 385. The TDVs 224, 244, 246, 248, 250, and 252 of FIG. 2 are example implementation of the TDV cells 390. The pillars 236 and 238 of FIG. 2 are example implementations of the TSV cells 395. The cells 385-395 are example multi-die cells, which enable the EDA circuitry 300 to determine characteristics of multi-die routes.

In some examples, the cell library 375 is instantiated by processor circuitry executing cell library instructions and/or configured to perform operations such as those represented by the flowcharts of FIGS. 4-8.

In some examples, the apparatus includes means for automating electrical design of a semiconductor package. For example, the means for automating electrical design of a semiconductor package design may be implemented by the EDA circuitry 300. In some examples, the EDA circuitry 300 may be instantiated by processor circuitry such as the example processor circuitry 912 of FIG. 9. For instance, the EDA circuitry 300 may be instantiated by the example microprocessor 1000 of FIG. 10 executing machine executable instructions such as those implemented by at least blocks 410-450 of FIG. 4, 510-560 of FIG. 5, 605-635 of FIG. 6A, 640-685 of FIG. 6B, 705-740 of FIG. 7A, 745-780 of FIG. 7B, and 810-860 of FIG. 8. In some examples, the EDA circuitry 300 may be instantiated by hardware logic circuitry, which may be implemented by an ASIC, XPU, or the FPGA circuitry 1100 of FIG. 11 structured to perform operations corresponding to the machine-readable instructions. Additionally or alternatively, the EDA circuitry 300 may be instantiated by any other combination of hardware, software, and/or firmware. For example, the condition determination circuitry _00 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for automating electrical design of a semiconductor package includes means for managing a semiconductor package. For example, the means for managing a semiconductor package may be implemented by the package manager circuitry 310. In some examples, the package manager circuitry 310 may be instantiated by processor circuitry such as the example processor circuitry 912 of FIG. 9. For instance, the package manager circuitry 310 may be instantiated by the example microprocessor 1000 of FIG. 10 executing machine executable instructions such as those implemented by at least blocks 410 and 450 of FIGS. 4, 510 and 560 of FIG. 5, and 615 of FIG. 6A. In some examples, the package manager circuitry 3100 may be instantiated by hardware logic circuitry, which may be implemented by an ASIC, XPU, or the FPGA circuitry 1100 of FIG. 11 structured to perform operations corresponding to the machine-readable instructions. Additionally or alternatively, the package manager circuitry 310 may be instantiated by any other combination of hardware, software, and/or firmware. For example, the package manager circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for automating electrical design of a semiconductor package includes means for verifying a design of a semiconductor package. For example, the means for verifying a design of a semiconductor package may be implemented by the verification manager circuitry 320. In some examples, the verification manager circuitry 320 may be instantiated by processor circuitry such as the example processor circuitry 912 of FIG. 9. For instance, the verification manager circuitry 320 may be instantiated by the example microprocessor 1000 of FIG. 10 executing machine executable instructions such as those implemented by at least blocks 440 of FIGS. 4, 715 and 735 of FIG. 7A, 765 of FIG. 7B, and 615 of FIG. 6A. In some examples, the verification manager circuitry 320 may be instantiated by hardware logic circuitry, which may be implemented by an ASIC, XPU, or the FPGA circuitry 1100 of FIG. 11 structured to perform operations corresponding to the machine-readable instructions. Additionally or alternatively, the verification manager circuitry 320 may be instantiated by any other combination of hardware, software, and/or firmware. For example, the verification manager circuitry 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for automating electrical design of a semiconductor package includes means for implementing an RTL design. For example, the means for implementing an RTL design may be implemented by the RTL manager circuitry 330. In some examples, the RTL manager circuitry 330 may be instantiated by processor circuitry such as the example processor circuitry 912 of FIG. 9. For instance, the RTL manager circuitry 330 may be instantiated by the example microprocessor 1000 of FIG. 10 executing machine executable instructions such as those implemented by at least blocks 520 and 530 of FIGS. 5, 605 and 610 of FIG. 6A, 685 of FIG. 6B, and 810 and 860 of FIG. 8. In some examples, the RTL manager circuitry 330 may be instantiated by hardware logic circuitry, which may be implemented by an ASIC, XPU, or the FPGA circuitry 1100 of FIG. 11 structured to perform operations corresponding to the machine-readable instructions. Additionally or alternatively, the RTL manager circuitry 330 may be instantiated by any other combination of hardware, software, and/or firmware. For example, the RTL manager circuitry 330 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for automating electrical design of a semiconductor package includes means for picking cell circuitry from a cell library. For example, the means for picking cell circuitry from a cell library may be implemented by the pick manager circuitry 340. In some examples, the pick manager circuitry 340 may be instantiated by processor circuitry such as the example processor circuitry 912 of FIG. 9. For instance, the pick manager circuitry 340 may be instantiated by the example microprocessor 1000 of FIG. 10 executing machine executable instructions such as those implemented by at least blocks 620 and 625 of FIG. 6A, 720 and 740 of FIG. 7A, 745 and 780 of FIG. 7B, and 830 of FIG. 8. In some examples, the pick manager circuitry 340 may be instantiated by hardware logic circuitry, which may be implemented by an ASIC, XPU, or the FPGA circuitry 1100 of FIG. 11 structured to perform operations corresponding to the machine-readable instructions. Additionally or alternatively, the pick manager circuitry 340 may be instantiated by any other combination of hardware, software, and/or firmware. For example, the pick manager circuitry 340 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for automating electrical design of a semiconductor package includes means for routing cell circuitry. For example, the means for routing cell circuitry may be implemented by the route manager circuitry 350. In some examples, the route manager circuitry 350 may be instantiated by processor circuitry such as the example processor circuitry 912 of FIG. 9. For instance, the route manager circuitry 350 may be instantiated by the example microprocessor 1000 of FIG. 10 executing machine executable instructions such as those implemented by at least blocks 630 of FIG. 6A, 645, 650, and 670 of FIG. 6B, 760 of FIG. 7B, and 850 of FIG. 8. In some examples, the route manager circuitry 350 may be instantiated by hardware logic circuitry, which may be implemented by an ASIC, XPU, or the FPGA circuitry 1100 of FIG. 11 structured to perform operations corresponding to the machine-readable instructions. Additionally or alternatively, the route manager circuitry 350 may be instantiated by any other combination of hardware, software, and/or firmware. For example, the route manager circuitry 350 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for automating electrical design of a semiconductor package includes means for placing cell circuitry. For example, the means for placing cell circuitry may be implemented by the place manager circuitry 360. In some examples, the place manager circuitry 360 may be instantiated by processor circuitry such as the example processor circuitry 912 of FIG. 9. For instance, the place manager circuitry 360 may be instantiated by the example microprocessor 1000 of FIG. 10 executing machine executable instructions such as those implemented by at least blocks 635 of FIG. 6A, 640, and 660 of FIG. 6B, 750 and 755 of FIG. 7B, and 840 of FIG. 8. In some examples, the place manager circuitry 360 may be instantiated by hardware logic circuitry, which may be implemented by an ASIC, XPU, or the FPGA circuitry 1100 of FIG. 11 structured to perform operations corresponding to the machine-readable instructions. Additionally or alternatively, the place manager circuitry 360 may be instantiated by any other combination of hardware, software, and/or firmware. For example, the place manager circuitry 360 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for automating electrical design of a semiconductor package includes characterizing cell circuitry. For example, the means for characterizing cell circuitry may be implemented by the characteristic manager circuitry 370. In some examples, the characteristic manager circuitry 370 may be instantiated by processor circuitry such as the example processor circuitry 912 of FIG. 9. For instance, the characteristic manager circuitry 370 may be instantiated by the example microprocessor 1000 of FIG. 10 executing machine executable instructions such as those implemented by at least blocks 705, 710, and 725 of FIG. 7A. In some examples, the characteristic manager circuitry 370 may be instantiated by hardware logic circuitry, which may be implemented by an ASIC, XPU, or the FPGA circuitry 1100 of FIG. 11 structured to perform operations corresponding to the machine-readable instructions. Additionally or alternatively, the characteristic manager circuitry 370 may be instantiated by any other combination of hardware, software, and/or firmware. For example, the characteristic manager circuitry 370 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the EDA circuitry 300 is illustrated in FIG. 3, one or more of the elements, processes, and/or devices illustrated in FIG. 3 may be combined, divided, re-arranged, omitted, eliminated, and/or implemented in any other way. Further, the package manager circuitry 310 of FIG. 3, the verification manager circuitry 320 of FIG. 3, the RTL manager circuitry 330 of FIG. 3, the pick manager circuitry 340 of FIG. 3, the route manager circuitry 350 of FIG. 3, the place manager circuitry 360 of FIG. 3, and the characteristic manager circuitry 370 of FIG. 3 and/or, more generally, the example EDA circuitry 300 of FIG. 3, may be implemented by hardware alone or by hardware in combination with software and/or firmware. Thus, for example, any of the package manager circuitry 310, the verification manager circuitry 320, the RTL manager circuitry 330, the pick manager circuitry 340, the route manager circuitry 350, the place manager circuitry 360, and the characteristic manager circuitry 370, and/or, more generally, the example EDA circuitry 300, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example EDA circuitry 300 of FIG. 3 may include one or more elements, processes, and/or devices in addition to, or instead of, those illustrated in FIG. 3, and/or may include more than one of any or all of the illustrated elements, processes and devices.

A flowchart representative of example machine readable instructions, which may be executed to configure processor circuitry to implement the EDA circuitry 300 of FIG. 3, is shown in FIG. 3. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on at least one non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-8, many other methods of implementing the example EDA circuitry 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine-readable medium, and non-transitory machine-readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
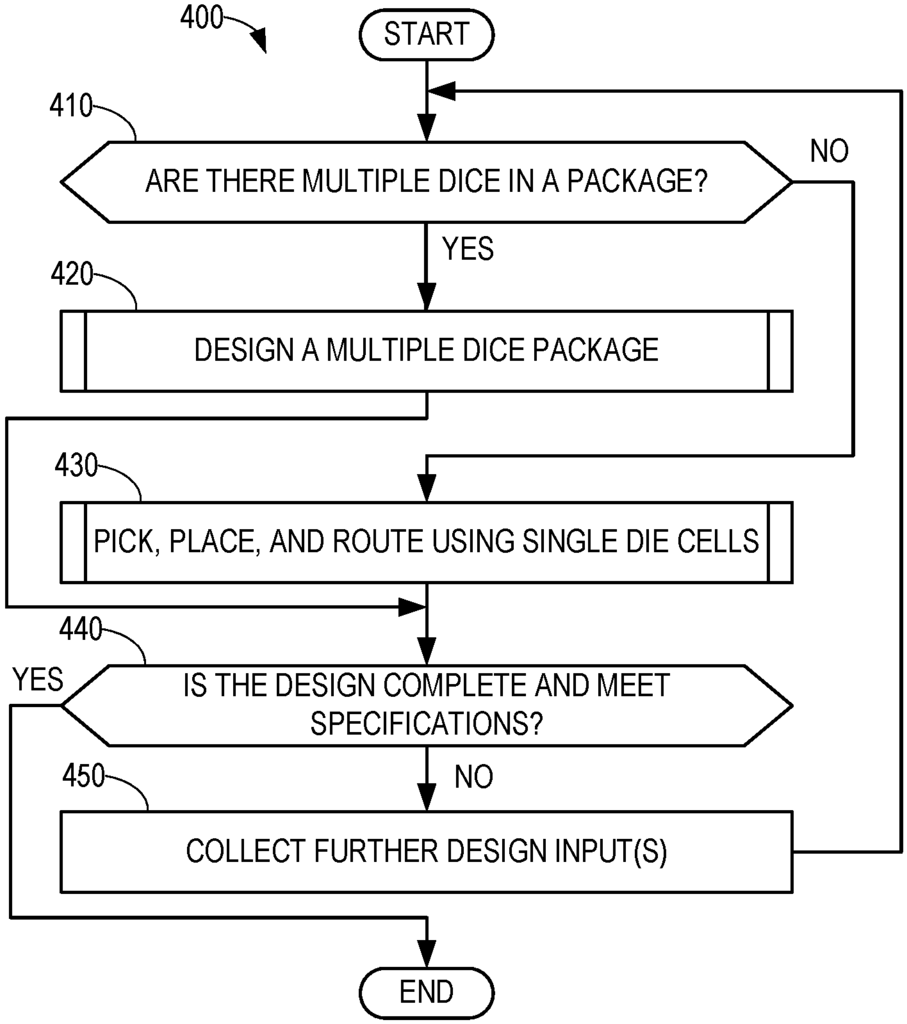
FIG. 4 is a flowchart representative of example machine readable instructions and/or example operations that may be executed by example processor circuitry to implement the electronic design automation circuitry of FIG. 3 to automate electronic design of semiconductor packages.

FIG. 4 is a flowchart representative of example machine readable instructions and/or example operations 400 that may be executed and/or instantiated by processor circuitry to automate electronic design of semiconductor packages. The machine-readable instructions and/or the operations 400 of FIG. 4 begin at block 410, at which the package manager circuitry 310 of FIG. 3 determines if there are multiple dice in a package. (Block 410). In some examples, the package manager circuitry 310 determines there are a plurality of die layers (e.g., the die layers 204-208 of FIG. 2) using design inputs from a designer.

If the package manager circuitry 310 determines there are multiple dice in the package (e.g., Block 410 returns a result of YES), the EDA circuitry 300 designs a multiple dice package. (Block 420). If the package manager circuitry 310 determines there are not multiple dice in the package (e.g., Block 410 returns a result of NO), the EDA circuitry 300 designs a single die package. (Block 430).

The verification manager circuitry 320 of FIG. 3 determines if the design is complete and meets specifications. (Block 440). In some examples, the verification manager circuitry 320 compares characteristics from the characteristic manager circuitry 370 of FIG. 3 to design specifications. The verification manager circuitry 320 may determine whether a design is not complete based on a determination, by the RTL manager circuitry 330 of FIG. 3, that an RTL design is not fully implemented or could not be fully implemented.

If the verification manager circuitry 320 of FIG. 3 determines the design is not complete or does not meet specifications (e.g., Block 440 returns a result of NO), the package manager circuitry 310 collects further design inputs. (Block 450). For example, the place manager circuitry 360 of FIG. 3 is unable to place all cell circuitry inside a die layer (e.g., the die design 100 of FIG. 1).

If the verification manager circuitry 320 of FIG. 3 determines the design is complete and meets specifications (e.g., Block 440 returns a result of YES), the process 400 proceeds to end. For example, the RTL manager circuitry 330 indicates that an RTL design is fully implemented and/or execution of the manager circuitry 340-360 completes.

Although example processes are described with reference to the flowchart illustrated in FIG. 4, many other methods of automating electronic design of a semiconductor package may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 5:
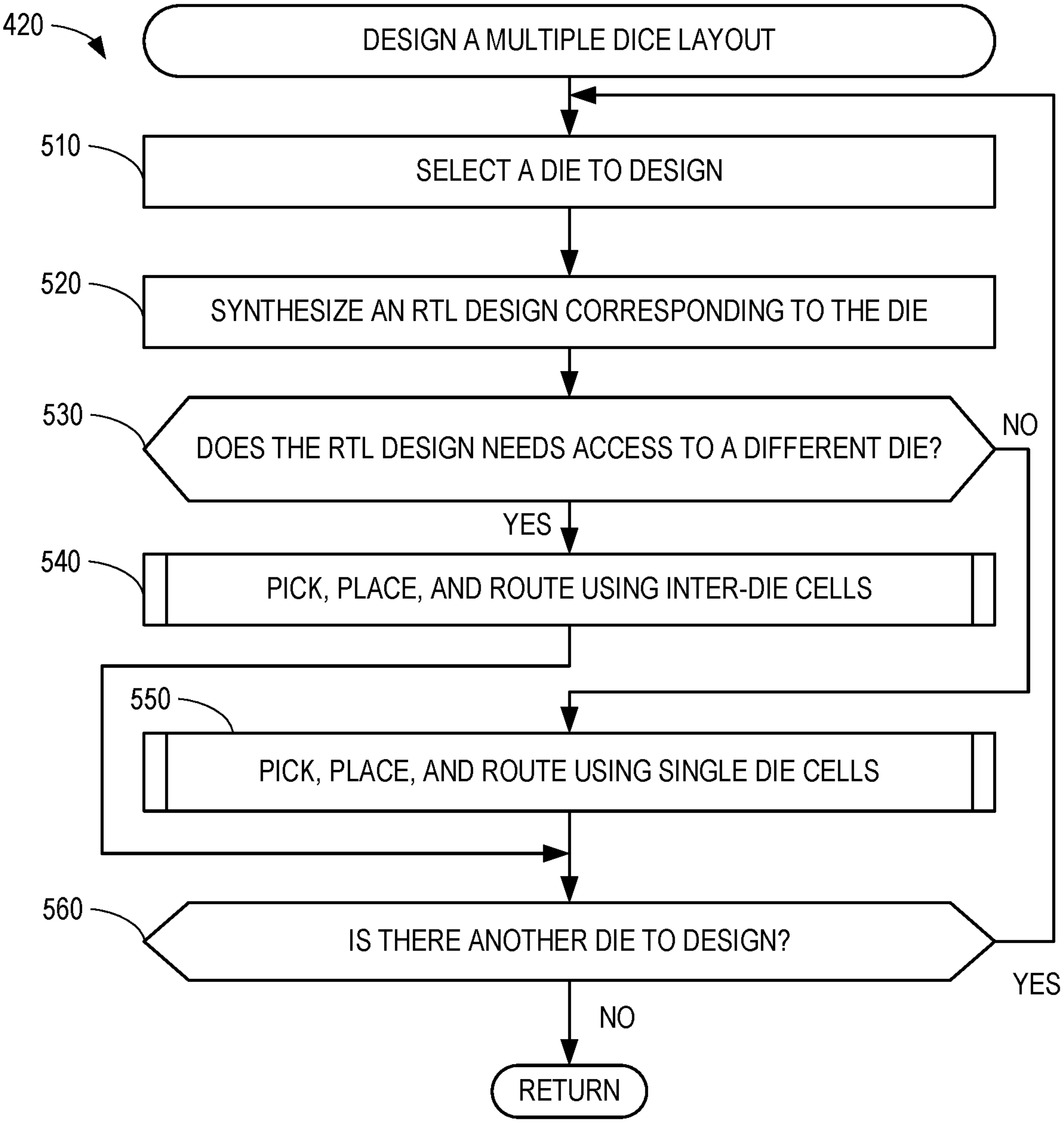
FIG. 5 is a flowchart representative of example machine readable instructions and/or example operations that may be executed by example processor circuitry to implement the electronic design automation circuitry of FIG. 3 to automate electronic design of a multi-die semiconductor package.

FIG. 5 is a flowchart representative of example machine readable instructions and/or example operations 420 that may be executed and/or instantiated by processor circuitry to automate electronic design of a multi-dice semiconductor package. The machine-readable instructions and/or the operations 420 of FIG. 5 begin at block 510, at which the package manager circuitry 310 of FIG. 3 selects a die to design. (Block 510). In some examples, the package manager circuitry 310 begins on what would be considered a first die layer, such as the first die layer 204 of FIG. 2, that is or will be directly coupled to a semiconductor substrate (e.g., the package substrate 202 of FIG. 2). In such examples, the package manager circuitry 310 proceeds to a second die layer (e.g., the second die layer 206 of FIG. 2) that is directly coupled to the first die layer.

The RTL manager circuitry 330 synthesizes an RTL design corresponding to the die. (Block 520). In some examples, the RTL manager circuitry 330 synthesizes an RTL design from a relatively high abstraction. For example, the RTL manager circuitry 330 may synthesize a C program to generate an RTL design which is capable of being implemented by cell circuitry of the cell library 375 of FIG. 3. In some examples, the RTL manager circuitry 330 synthesizes a net list, part list, and/or list of operations to represent an RTL design.

The RTL manager circuitry 330 determines if the RTL design needs access to a different die. (Block 530). In some examples, the RTL manager circuitry 330 uses the synthesized RTL design to determine if an input and/or output of the RTL design, corresponding to a first die layer, needs to be coupled to an input and/or output of the RTL design, corresponding to a second die layer.

If the RTL manager circuitry 330 determines that the RTL design needs access to a different die (e.g., Block 530 returns a result of YES), the EDA circuitry 300 of FIG. 3 picks, places, and routes using inter-die cells. (Block 540). If the RTL manager circuitry 330 determines that the RTL design does not need access to a different die (e.g., Block 530 returns a result of NO), the EDA circuitry 300 picks, places, and routes using single die cells. (Block 550).

The package manager circuitry 310 determines if there is another die to design. (Block 560). If the package manager circuitry 310 determines there is another die to design (e.g., Block 560 returns a result of YES), the package manager circuitry 310 selects a die to design. (Block 510). If the package manager circuitry 310 determines there is not another die to design (e.g., Block 560 returns a result of NO), the operations of FIG. 5 return.

Although example processes are described with reference to the flowchart illustrated in FIG. 5, many other methods of automating electronic design of a multi dice semiconductor package may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 6A:
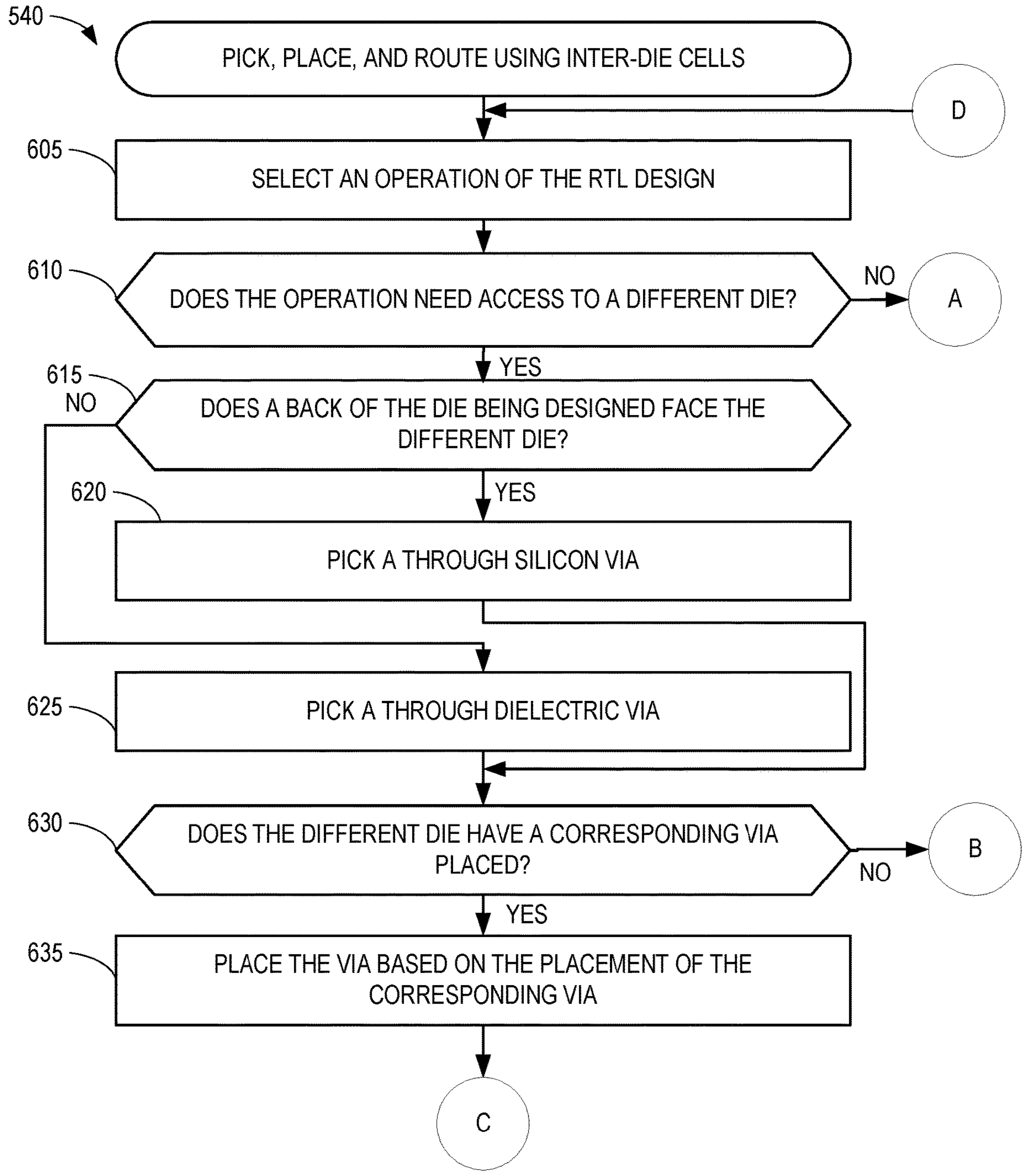
FIGS. 6A and 6B form a flowchart representative of example machine readable instructions and/or example operations that may be executed by example processor circuitry to implement the electronic design automation circuitry of FIG. 3 to pick, place, and route cell circuitry in a multi-die semiconductor package.
Figure 6B:
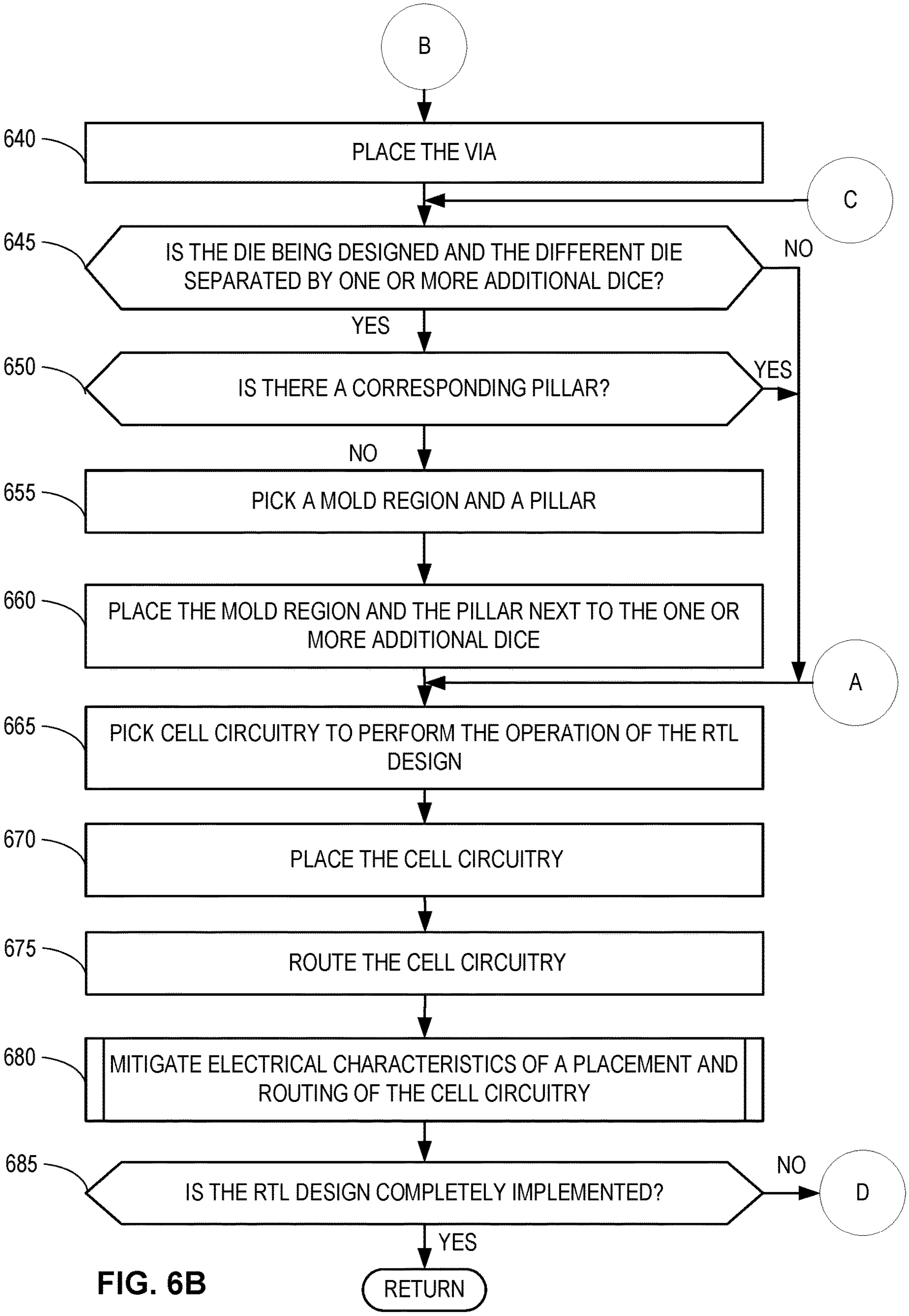

FIGS. 6A and 6B are a flowchart representative of example machine readable instructions and/or example operations 540 that may be executed and/or instantiated by processor circuitry to pick, place, and route cell circuitry in a multi-dice semiconductor package. The machine-readable instructions and/or the operations 540 of FIG. 5 begin at block 605, at which the RTL manager circuitry 330 of FIG. 3 selects an operation of the RTL design. (Block 605). In some examples, the RTL manager circuitry 330 selects an operation of an RTL design by selecting one or more portions of a net list, part list, and/or list of operations. In such examples, the RTL manager circuitry 330 may modify the net list, part list, and/or list of operations to indicate that the operation has been implemented.

The RTL manager circuitry 330 determines if the operation needs access to a different die. (Block 610). In some examples, the RTL manager circuitry 330 determines if connected operations which are to be coupled to a selected operation is to be implemented on a different die layer from a die layer of the selected operation. For example, the RTL manager circuitry 330 determines a selected operation needs access to a different die layer when an output of the selected operation is to be coupled to an input of a connected operation on the different die layer.

If the RTL manager circuitry 330 determines that the operation does need access to a different die (e.g., Block 610 returns a result of YES), the package manager circuitry 310 of FIG. 3 determines if a back of the die being designed faces the different die. (Block 615). In some examples, the package manager circuitry 310 determines transitions between die layers based on design inputs from a designer. Example transitions, which may be determined by the package manager circuitry 310 are discussed, above, in connection with FIG. 2.

If the package manager circuitry 310 determines that the back of the die being designed does face the different die (e.g., Block 615 returns a result of YES), the pick manager circuitry 340 of FIG. 3 picks a through silicon via. (Block 620). For example, the package manager circuitry 310 determines a face-to-back transition when the first semiconductor substrate layer 212 of FIG. 2 is directly coupled to the second die circuitry layer 220 of FIG. 2.

If the package manager circuitry 310 determines that the back of the die being designed does not face the different die (e.g., Block 615 returns a result of NO), the pick manager circuitry 340 picks a through dielectric via. (Block 325). For example, the package manager circuitry 310 determines a back-to-face transition if die circuitry of a die layer being designed is directly coupled a semiconductor substrate of a different die layer.

The route manager circuitry 350 of FIG. 3 determines if the different die has a corresponding via placed. (Block 630). For example, the route manager circuitry 350 determines if a connected operation, which is to be coupled to a selected operation, has been placed on the different die.

If the route manager circuitry 350 determines that the different die has a corresponding via placed (e.g., Block 630 returns a result of YES), the place manager circuitry 360 of FIG. 3 places the via based on the placement of the corresponding via. (Block 635). In some examples, the place manager circuitry 360 places the via on the die layer being designed to electrically couple the via to the corresponding via location.

If the route manager circuitry 350 determines that the different die does not have a corresponding via placed (e.g., Block 630 returns a result of NO), the place manager circuitry 360 places the via. (Block 640). In some examples, the place manager circuitry 360 places the via in a portion of the die layer that the place manager circuitry 360 has yet to place cell circuitry. In some examples, the place manager circuitry 360 may determine the portion of the die layer based on the package manager circuitry 310. In such examples, the place manager circuitry 360 updates the package manager circuitry 310 to include the placed via location.

The route manager circuitry 350 determines if the die being designed and the different die are separated by one or more additional dice. (Block 645). In some examples, the route manager circuitry 350 determines a location of the different die layer in comparison to the die layer being processed using design details from the package manager circuitry 310.

If the route manager circuitry 350 determines the die being designed and the different die are separated by one or more additional dice (e.g., Block 645 returns a result of YES), the route manager circuitry 350 determines if there is a corresponding pillar. (Block 650). For example, the route manager circuitry 350 determines if a mold region and a pillar element have been selected and placed to route the connected operation to the operation being designed.

If the route manager circuitry 350 determines there is not a corresponding pillar (e.g., Block 650 returns a result of NO), the pick manager circuitry 340 picks a mold region and a pillar. (Block 655). For example, the pick manager circuitry 340 picks one of the pillar cells 395 of FIG. 3 from the cell library 375 to electrically couple the die layer being designed to the different die layer. In such examples, the pick manager circuitry 340 considers a number of die layers separating the die layer being designed and the different die layer.

The place manager circuitry 360 the places the mold region and the pillar next to the one or more additional dice. (Block 660). In some examples, the place manager circuitry 360 adjusts placement of die layers separating the die layer being designed and the different die layer to create a portion of the semiconductor package. The place manager circuitry 360 may update the package manager circuitry 310 to identify the portion of the semiconductor package as an area to be filled with a mold material that encloses a pillar element. In other examples, the place manager circuitry 360 may add a different pillar element to an already existing mold region.

If the RTL manager circuitry 330 determines the operation does not need access to a different die (e.g., Block 610 returns a result of NO), the route manager circuitry 350 determines the die being designed and the different die are not separated by one or more additional die (e.g., Block 645 returns a result of NO), the route manager circuitry 350 determines there is a corresponding pillar (e.g., Block 650 returns a result of YES), or the place manager circuitry 360 completes adjusting placement of the via based on the placement of the pillar (Block 660 is completed), the pick manager circuitry 340 picks cell circuitry to perform the operation of the RTL design. (Block 665). In some examples, the pick manager circuitry 340 picks one or more of the cells 380 of FIG. 3 from the cell library 375, based on the operation selected by the RTL manager circuitry 330 and context of the operation from the RTL manager circuitry 330.

The place manager circuitry 360 places the cell circuitry. (Block 670). In some examples, the place manager circuitry 360 selects a portion of the semiconductor package that does not correspond to placement and/or routing of different cell circuitry to place the cell circuitry being designed. In some examples, the place manager circuitry 360 updates the package manager circuitry 310 to prevent subsequent cell circuitry from being placed and/or routed through the selected placement.

The route manager circuitry 350 routes the cell circuitry. (Block 675). In some examples, the route manager circuitry 350 determines placement of already places cell circuitry to generate one or more potential routes between cell circuitry to be coupled to the cell circuitry being designed. In such examples, the route manager circuitry 350 may update the package manager circuitry 310 to prevent subsequent cell circuitry from being placed on the route.

The EDA circuitry 300 mitigates electrical characteristics of a placement and routing the cell circuitry. (Block 680).

The RTL manager circuitry 330 determines if the RTL design is completely implemented. (Block 685). If the RTL manager circuitry 330 determines the RTL design is not completely implemented (e.g., Block 685 returns a result of NO), the RTL manager circuitry 330 selects an operation of the RTL design. (Block 605). For example, the RTL manager circuitry 330 determines that some operations do not include indications and/or placement information that identify the operation as implemented. If the RTL manager circuitry 330 determines the RTL design is completely implemented (e.g., Block 685 returns a result of YES), the process of FIGS. 6A and 6B proceeds to return. For example, the RTL manager circuitry 330 determines that all operations have indications and/or placement information that identify the operation as implemented.

Although example processes are described with reference to the flowchart illustrated in FIGS. 6A and 6B, many other methods of picking, placing, and routing cells in a multi dice semiconductor package may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 7A:
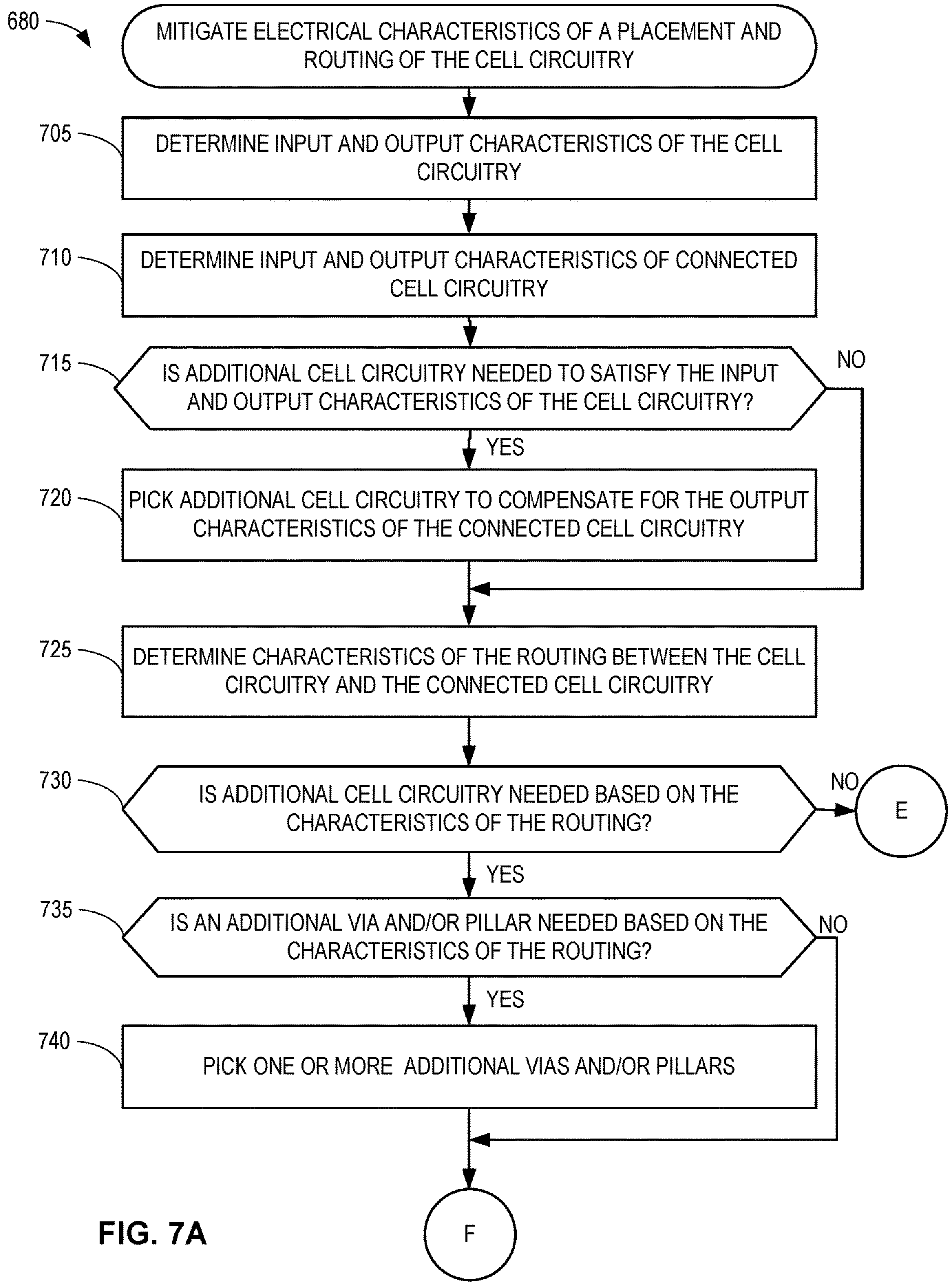
FIGS. 7A and 7B form a flowchart representative of example machine readable instructions and/or example operations that may be executed by example processor circuitry to implement the electronic design automation circuitry of FIG. 3 to mitigate electrical characteristics based on a placement and routing of cell circuitry.
Figure 7B:
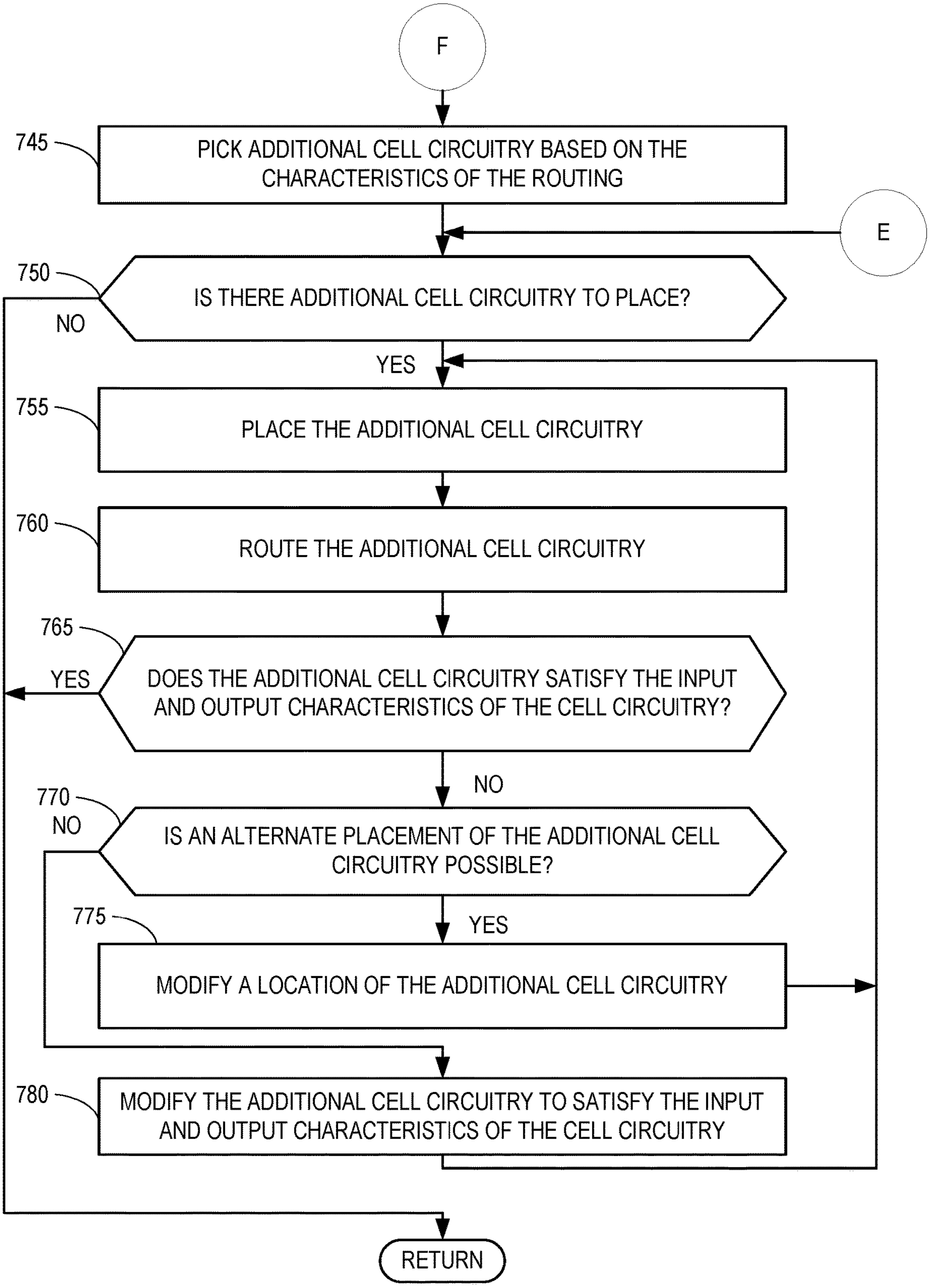

FIGS. 7A and 7B are a flowchart representative of example machine readable instructions and/or example operations 680 that may be executed and/or instantiated by processor circuitry to mitigate electrical characteristics based on a location in a design. The machine-readable instructions and/or the operations 680 of FIG. 6 begin at block 705, at which the characteristic manager circuitry 370 of FIG. 3 determines input and output characteristics of the cell circuitry. (Block 705). In some examples, the characteristic manager circuitry 370 determines characteristics of specific cell circuitry by accessing characteristics information included in the cell picked by the pick manager circuitry 340. Some instances of the characteristic manager circuitry 370 may derive characteristics of the cell circuitry from information in the cell corresponding to the cell circuitry. For example, the characteristic manager circuitry 370 may derive a bandwidth of the cell circuitry based on electrical characteristics of the cell circuitry. In such an example, the characteristic manager circuitry 370 may derive cut-off frequencies of the cell circuitry using impedance values.

The characteristic manager circuitry 370 determines input and output characteristics of connected cell circuitry. (Block 710). In some examples, the characteristic manager circuitry 370 may access characteristic information of already placed cell circuitry as the input and output characteristics of the connected cells.

The verification manager circuitry 320 of FIG. 3 determines if additional cell circuitry is needed to satisfy the input and output characteristics of the cell circuitry. (Block 715). In some examples, the verification manager circuitry 320 compares characteristics of the cell circuitry being designed to the characteristics of the already placed cell circuitry to determine compatibility.

If the verification manager circuitry 320 determines that additional cell circuitry is needed to satisfy the input and output characteristics of the cell circuitry (e.g., Block 715 returns a result of YES), the pick manager circuitry 340 picks cell circuitry to compensate for the output characteristics of the connected cell circuitry. (Block 720). In some examples, the pick manager circuitry 340 picks one or more of the cells 380 of FIG. 3 from the cell library 375 of FIG. 3 to modify the characteristics of the already placed cell circuitry to satisfy the characteristics of the cell circuitry being designed. Alternatively, the pick manager circuitry 340 may re-pick the already placed cell circuitry to compensate for the characteristics of the cell circuitry being placed.

The characteristic manager circuitry 370 determines characteristics of the routing between the cell circuitry and the connected cell circuitry. (Block 725). In some examples, the characteristic manager circuitry 370 determines electrical characteristics, such as impedance, parasitic capacitance, proximity to different cell circuitry, etc. Such electrical characteristics may be calculated using equations and/or predetermined equations.

The verification manager circuitry 320 determines if additional cell circuitry is needed based on the characteristics of the routing. (Block 730). In some examples, the verification manager circuitry 320 compares the electrical characteristics of the routing to threshold values, included in the cell representing the cell circuitry and/or set by a designer, to determine whether additional cell circuitry should be picked.

If the verification manager circuitry 320 determines additional cell circuitry is needed based on the characteristics of the routing (e.g., Block 730 returns a result of YES), the verification manager circuitry 320 determines if an additional via is needed based on the characteristics of the routing. (Block 735). In some examples, the verification manager circuitry 320 determines if the resistance of the trace, which includes considerations for a placed via, needs to be reduced. For example, the characteristic manager circuitry 370 may include a maximum resistance of a trace value as one of the characteristics of the cell circuitry being placed.

If the verification manager circuitry 320 determines that an additional via is needed (e.g., Block 735 returns a result of YES), the pick manager circuitry 340 picks one or more additional vias. (Block 740). For example, the pick manager 340 picks another via to reduce a resistance of a route, which includes one or more vias, when the resistance is greater than a threshold resistance.

The pick manager circuitry 340 picks additional cell circuitry based on the characteristics of the routing. (Block 745). In some examples, the pick manager circuitry 340 picks cell circuitry to account for characteristics of a route. For example, the pick manager circuitry 340 picks cell circuitry to buffer a clock signal based on a determination that a route is longer than a maximum route length.

If the verification manager circuitry 320 determines additional cell circuitry is not needed based on the characteristics of the routing (e.g., Block 730 returns a result of NO) or the pick manager circuitry 340 picks additional cell circuitry based on characteristics of the routing (e.g., Block 745 is completed), the place manager circuitry 360 determines if there is additional cell circuitry to place. (Block 750).

If the place manager circuitry 360 determines there is cell circuitry to place (e.g., Block 750 returns a result of YES), the place manager circuitry 360 places the additional cell circuitry. (Block 755). In some examples, the place manager circuitry 360 determines a portion of the die layer to place the additional cell circuitry based on placement information of already placed cell circuitry.

The route manager circuitry 350 routes the additional cell circuitry. (Block 760). In some examples, the route manager circuitry 350 modifies already placed routes to pass through the additional cell circuitry. For example, the route manager circuitry 350 may re-route an already determined route to couple buffer circuitry in-line. In such an example, the buffer circuitry increases a drive strength of a signal coupled to the route.

The verification manager circuitry 320 determines if the additional cell circuitry satisfies the input and output characteristics of the cell circuitry. (Block 765). In some examples, the verification manager circuitry 320 compares the characteristics of the cell circuitry being designed to the modified characteristics of the additional cell circuitry.

If the verification manager circuitry 320 determines the additional cell circuitry does not satisfy the input and output characteristics of the cell circuitry (e.g., Block 765 returns a result of NO), the place manager circuitry 360 determines if an alternate placement of the additional cell circuitry is possible. (Block 770). In some examples, modifications to routing and/or placement of cell circuitry may result in unintended modifications to characteristics of cell circuitry. For example, placing buffer circuitry may extend a route to a distance which creates a resistance greater than the threshold value. In some examples, the place manager circuitry 360 tracks attempted placement information to prevent attempting a similar placement in the future.

If the place manager circuitry 360 determines that an alternate placement of the additional cell circuitry is possible (e.g., Block 770 returns a result of YES), the place manager circuitry 360 modifies a location of the additional cell circuitry. (Block 775). For example, the place manager circuitry 360 may modify placement of the cell circuitry being designed and/or the additional cell circuitry to correct for unintended modifications.

If the place manager circuitry 360 determines that an alternate placement of the additional cell circuitry is not possible (e.g., Block 770 returns a result of NO), the pick manager circuitry 340 modifies the additional cell circuitry to satisfy the input and output characteristics of the cell circuitry. (Block 780). For example, the pick manager circuitry 340 may re-pick the additional cell circuitry and/or the cell circuitry being designed to account for additional characteristics caused by routing.

If the place manager circuitry 360 modifies the location of the additional cell circuitry (Block 775 is completed) or the pick manager circuitry 340 modifies the additional cell circuitry to satisfy the input and output characteristics of the cell circuitry (Block 780 is completed), the place manager circuitry 360 places the additional cell circuitry. (Block 755). If the place manager circuitry 360 determines there is no additional cell circuitry to place (e.g., Block 750 returns a result of NO) or the verification manager circuitry 320 determines that the additional cell circuitry satisfies the input and output characteristics of the cell circuitry (e.g., Block 765 returns a result of YES), the operations of FIGS. 7A and 7B return.

Although example processes are described with reference to the flowchart illustrated in FIGS. 7A and 7B, many other methods of mitigating electrical characteristics based on a location in a design may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 8:
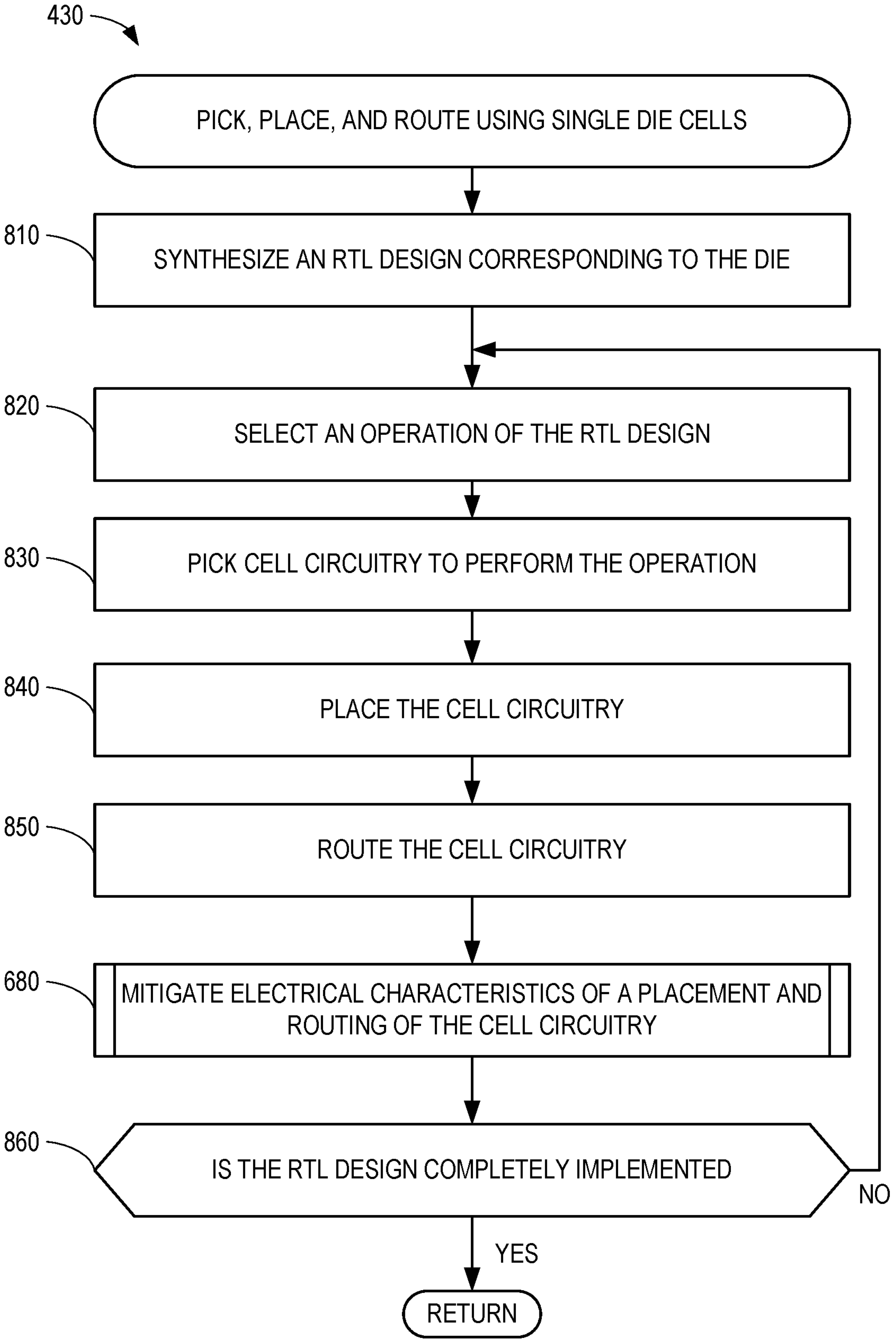
FIG. 8 is a flowchart representative of example machine readable instructions and/or example operations that may be executed by example processor circuitry to implement the electronic design automation circuitry of FIG. 3 to automate electronic design of a single die semiconductor package.

FIG. 8 is a flowchart representative of example machine readable instructions and/or example operations 430 that may be executed and/or instantiated by processor circuitry to automate electronic design of single die semiconductor packages. The machine-readable instructions and/or the operations 430 of FIG. 4 begin at block 810, at which the RTL manager circuitry 330 of FIG. 3 synthesizes an RTL corresponding to the die. (Block 810).

The RTL manager circuitry 330 selects an operation of the RTL design. (Block 820). The pick manager circuitry 340 of FIG. 3 picks cell circuitry to perform the cell circuitry. (Block 830). The place manager circuitry 360 of FIG. 3 places the cell circuitry. (Block 840).

The route manager circuitry 350 of FIG. 3 routes the cell circuitry. (Block 850). The EDA circuitry 300 of FIG. 3 mitigates electrical characteristics of the placement and routing of the cell circuitry. (Block 680 of FIGS. 6B, 7A, and 7B).

The RTL manager circuitry 330 determines if the RTL design is completely implemented. (Block 860). If the RTL manager circuitry 330 determines the RTL design is not completely implemented (e.g., Block 860 returns a result of NO), the RTL manager circuitry 330 selects an operation of the RTL design. (Block 820). If the RTL manager circuitry 330 determines the RTL design is completely implemented (e.g., Block 860 returns a result of YES), the operations of FIG. 8 returns.

Although example processes are described with reference to the flowchart illustrated in FIG. 8, many other methods of automating electronic design of a single die semiconductor package may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 9:
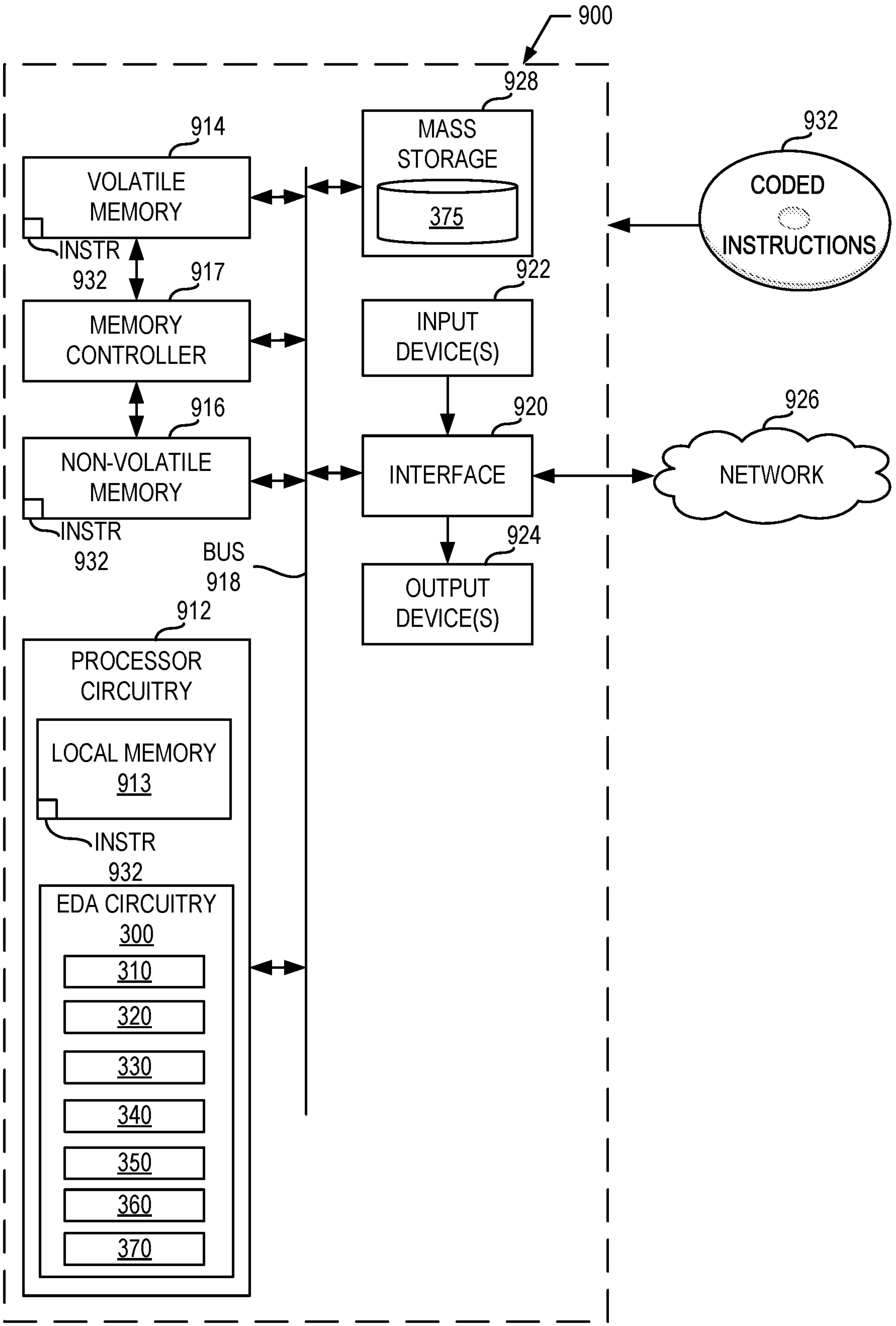
FIG. 9 is a block diagram of an example processing platform including processor circuitry structured to execute the example machine readable instructions and/or the example operations of FIGS. 4-8 to implement the electronic design automation circuitry of FIG. 3.

FIG. 9 is a block diagram of an example processor platform 900 structured to execute and/or instantiate the machine-readable instructions and/or the operations of FIGS. 4-8 to implement the EDA circuitry 300 of FIG. 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the package manager circuitry 310 of FIG. 3, the verification manager circuitry 320 of FIG. 3, the RTL manager circuitry 330 of FIG. 3, the pick manager circuitry 340 of FIG. 3, the route manager circuitry 350 of FIG. 3, the place manager circuitry 360 of FIG. 3, and the characteristic manager circuitry 370 of FIG. 3

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, a microphone, a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data, such as the cell library 375 of FIG. 3. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine-readable instructions 932, which may be implemented by the machine-readable instructions of FIGS. 4-8, may be stored in the mass storage device 928, in the volatile memory 914, in the non-volatile memory 916, and/or on a removable non-transitory computer readable storage medium such as a CD or DVD.

Figure 10:
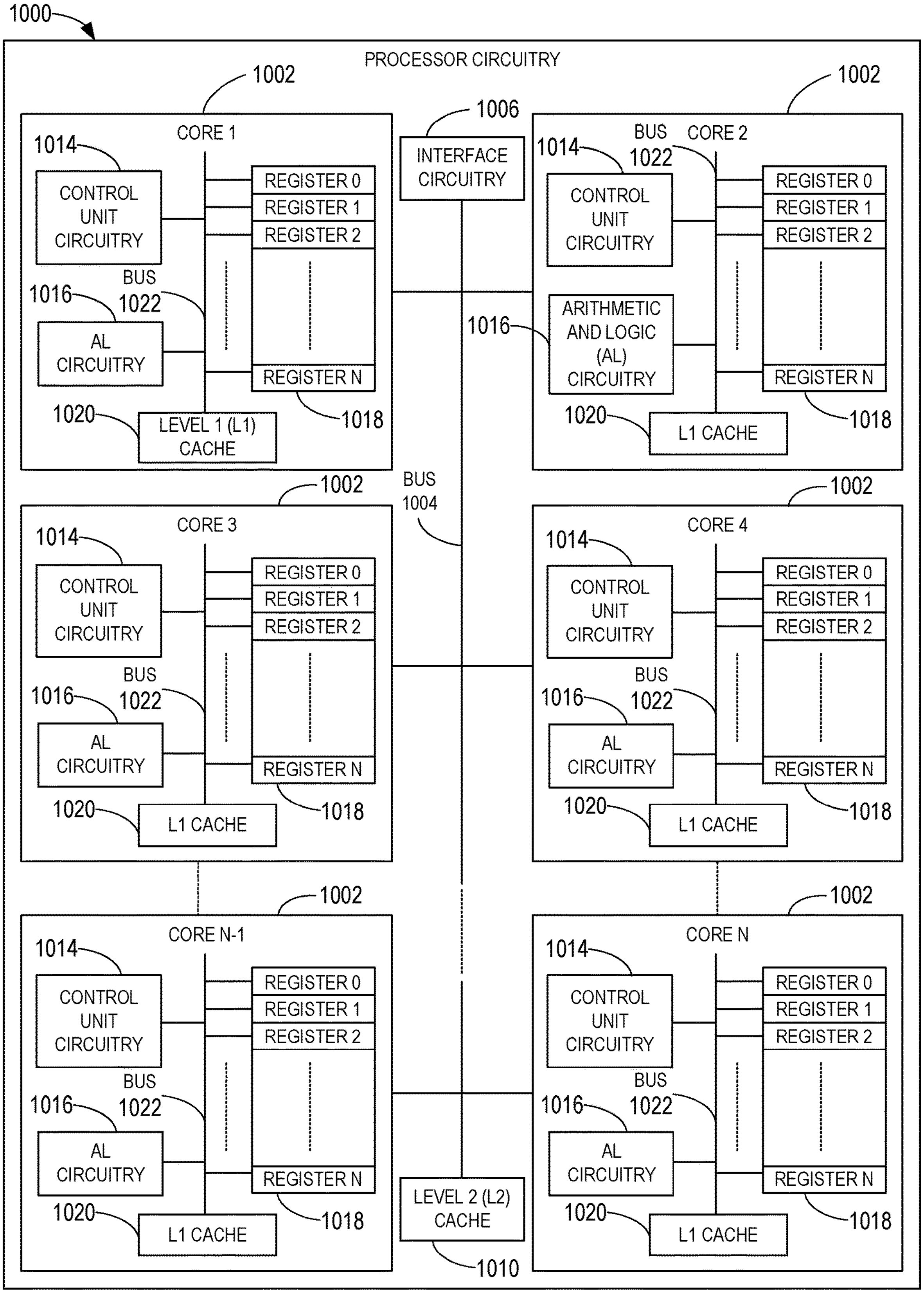
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general-purpose microprocessor (e.g., general purpose microprocessor circuitry). The microprocessor 1000 executes some or all of the machine-readable instructions of the flowcharts of FIGS. 4-8 to effectively instantiate the EDA circuitry 300 of FIG. 3 as logic circuits to perform the operations corresponding to those machine-readable instructions. In some such examples, the EDA circuitry 300 of FIG. 3 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine-readable instructions and/or operations represented by the flowcharts of FIGS. 4-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer-based operations. In other examples, the AL circuitry 1016 also performs floating point operations. In yet other examples, the AL circuitry 1016 may include first AL circuitry that performs integer-based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
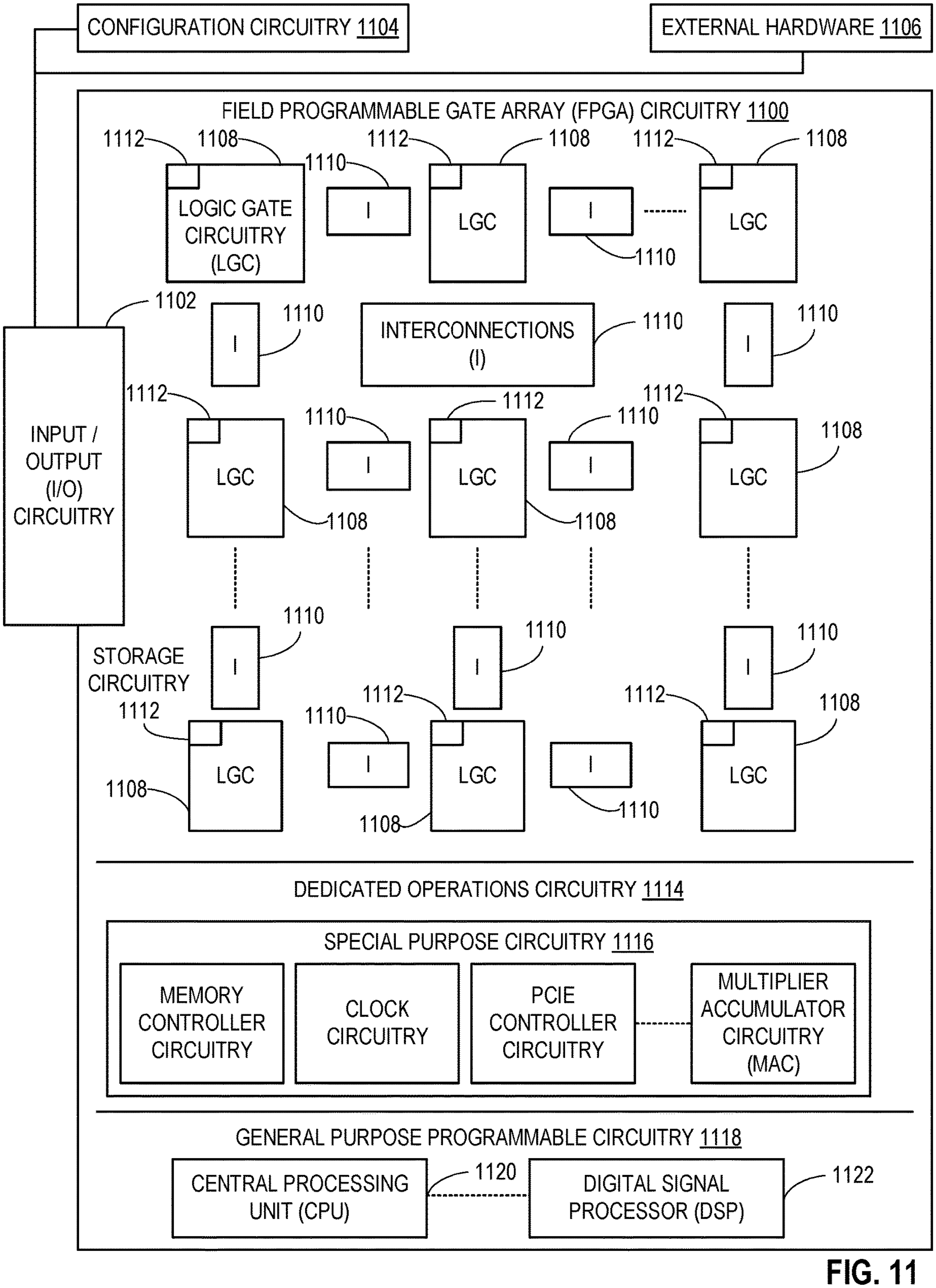
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine-readable instructions. However, once configured, the FPGA circuitry 1100 instantiates the machine-readable instructions in hardware and, thus, can often execute the operations faster than they could be performed by a general-purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 4-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 4-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some, or all of the software represented by the flowcharts of FIGS. 4-8. As such, the FPGA circuitry 1100 may be structured to effectively instantiate some or all of the machine-readable instructions of the flowcharts of FIGS. 4-8 as dedicated logic circuits to perform the operations corresponding to those software instructions in a dedicated manner analogous to an ASIC. Therefore, the FPGA circuitry 1100 may perform the operations corresponding to the some or all of the machine-readable instructions of FIGS. 4-8 faster than the general-purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine-readable instructions of FIGS. 4-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine-readable instructions represented by the flowcharts of FIG. 4-8 may be executed by one or more of the cores 1002 of FIG. 10, a second portion of the machine-readable instructions represented by the flowcharts of FIGS. 4-8 may be executed by the FPGA circuitry 1100 of FIG. 11, and/or a third portion of the machine-readable instructions represented by the flowcharts of FIGS. 4-8 may be executed by an ASIC. It should be understood that some or all of the EDA circuitry 300 of FIG. 3 may, thus, be instantiated at the same or different times. Some or all of the circuitry may be instantiated, for example, in one or more threads executing concurrently and/or in series. Moreover, in some examples, some or all of the EDA circuitry 300 of FIG. 3 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example methods, apparatus, systems, and articles of manufacture to automate a design including routing between dice are disclosed herein. Further examples and combinations thereof include the following: Example 1 includes an apparatus comprising at least one memory, machine-readable instructions, and processor circuitry to at least one of execute or instantiate the machine-readable instructions to obtain a register-transfer level design defining operations of electrical circuits in first and second dice of a multi-die semiconductor package, the second die to be stacked on the first die in the multi-die semiconductor package, and select placement of a cell for a physical layout for the multi-die semiconductor package based on the register-transfer level design, the cell including a via to electrically interconnect the first die to the second die.

Example 2 includes the apparatus of example 1, wherein the multi-die semiconductor package is to include a third die stacked between the first die and the second die, and the processor circuitry is to select the placement of the cell to extend between the first die and the second die external to the third die, the cell including a through mold via.

Example 3 includes the apparatus of example 1, wherein the multi-die semiconductor package is to include a third die stacked between the first die and the second die, and the processor circuitry is to select the placement of the cell to extend through the third die, the cell including a through silicon via.

Example 4 includes the apparatus of example 1, wherein the processor circuitry is to determine characteristics of the cell, determine characteristics of connected cells, the connected cells to be coupled to the cell, and select one or more additional cells based on a comparison of the characteristics of the cell and the characteristics of the connected cells.

Example 5 includes the apparatus of example 1, wherein the via is a first via and the processor circuitry is to determine a resistance of the via, select a second via based on a determination that the resistance is greater than a threshold, the second via being an instance of the first via, and place and route the second via in parallel to the first via.

Example 6 includes the apparatus of example 1, wherein the via is a through dielectric via, the placement is a first placement, and the processor circuitry is to determine the first placement of the through dielectric via based on a second placement of a through silicon via on the second die.

Example 7 includes the apparatus of example 1, wherein the via is a through silicon via, the placement is a first placement, and the processor circuitry is to determine the first placement of the through silicon via based on a second placement of a through dielectric via on the second die.

Example 8 includes At least one non-transitory computer readable storage medium comprising instructions that, when executed, cause processor circuitry to at least obtain a register-transfer level design defining operations of electrical circuits in first and second dice of a multi-die semiconductor package, the second die to be stacked on the first die in the multi-die semiconductor package, and select placement of a cell for a physical layout for the multi-die semiconductor package based on the register-transfer level design, the cell including a via to electrically interconnect the first die to the second die.

Example 9 includes the at least one non-transitory computer readable storage medium of example 8, wherein the multi-die semiconductor package is to include a third die stacked between the first die and the second die and the instructions, when executed, cause the processor circuitry to select the placement of the cell to extend between the first die and the second die external to the third die, the cell including a through mold via.

Example 10 includes the at least one non-transitory computer readable storage medium of example 8, wherein the multi-die semiconductor package is to include a third die stacked between the first die and the second die and the instructions, when executed, cause the processor circuitry to select the placement of the cell to extend through the third die, the cell including a through silicon via.

Example 11 includes the at least one non-transitory computer readable storage medium of example 8, wherein the instructions, when executed, cause the processor circuitry to determine characteristics of the cell, determine characteristics of connected cells, the connected cells to be coupled to the cell, and select one or more additional cells based on a comparison of the characteristics of the cell and the characteristics of the connected cells.

Example 12 includes the at least one non-transitory computer readable storage medium of example 8, wherein the via is a first via and the instructions, when executed, cause the processor circuitry to determine a resistance of the first via, select a second via based on a determination that the resistance is greater than a threshold, the second via being an instance of the first via, and place and route the second via in parallel to the first via.

Example 13 includes the at least one non-transitory computer readable storage medium of example 8, wherein the via is a through dielectric via, the placement is a first placement, and the instructions, when executed, cause the processor circuitry to determine the first placement of the through dielectric via based on a second placement of a through silicon via on the second die.

Example 14 includes the at least one non-transitory computer readable storage medium of example 8, wherein the via is a through silicon via, the placement is a first placement, and the instructions, when executed, cause the processor circuitry to determine the first placement of the through silicon via based on a second placement of a through dielectric via on the second die.

Example 15 includes a method comprising obtaining, by electronic design automation circuitry, a register-transfer level design defining operations of electrical circuits in first and second dice of a multi-die semiconductor package, the second die to be stacked on the first die in the multi-die semiconductor package, and selecting, by electronic design automation circuitry, placement of a cell for a physical layout for the multi-die semiconductor package based on the register-transfer level design, the cell including a via to electrically interconnect the first die to the second die.

Example 16 includes the method of example 15, wherein the multi-die semiconductor package is to include a third die stacked between the first die and the second die, further comprising selecting the placement of the cell to extend between the first die and the second die external to the third die, the cell including a through mold via.

Example 17 includes the method of example 15, wherein the multi-die semiconductor package is to include a third die stacked between the first die and the second die, further comprising selecting the placement of the cell to extend through the third die, the cell including a through silicon via.

Example 18 includes the method of example 15, further comprising determining characteristics of the cell, determining characteristics of connected cells, the connected cells to be coupled to the cell, and selecting one or more additional cells based on a comparison of the characteristics of the cell and the characteristics of the connected cells.

Example 19 includes the method of example 15, wherein the via is a first via, further comprising determining a resistance of the first via, selecting a second via based on a determination that the resistance is greater than a threshold, the second via being an instance of the first via, and placing and routing the second via in parallel to the first via.

Example 20 includes the method of example 15, wherein the via is a through dielectric via, the placement is a first placement, further comprising determining the first placement of the through dielectric via based on a second placement of a through silicon via on the second die.

Example 21 includes the method of example 15, wherein the via is a through silicon via, the placement is a first placement, further comprising determining the first placement of the through silicon via based on a second placement of a through dielectric via on the second die.

What is claimed is:

1. An apparatus comprising:

at least one memory;

machine-readable instructions; and at least one processor circuit to at least one of execute or instantiate the machine-readable instructions to:

obtain a register-transfer level design defining operations of electrical circuits in first and second dice of a multi-die semiconductor package, the second die to be stacked on the first die in the multi-die semiconductor package; and select placement of a cell for a physical layout for the multi-die semiconductor package based on the register-transfer level design, the cell corresponding to a multi-die via, the multi-die via to electrically interconnect the first die to the second die.

2. The apparatus of claim 1, wherein the multi-die semiconductor package is to include a third die stacked between the first die and the second die, and one or more of the at least one processor circuit is to select the placement of the cell to extend between the first die and the second die external to the third die, the multi-die via including a through mold via.

3. The apparatus of claim 1, wherein the multi-die semiconductor package is to include a third die stacked between the first die and the second die, and one or more of the at least one processor circuit is to select the placement of the cell to extend through the third die, the multi-die via including a through silicon via.

4. The apparatus of claim 1, wherein one or more of the at least one processor circuit is to:

determine characteristics of the cell;

determine characteristics of connected cells, the connected cells to be coupled to the cell; and select one or more additional cells based on a comparison of the characteristics of the cell and the characteristics of the connected cells.

5. The apparatus of claim 1, wherein the multi-die via is a first via and one or more of the at least one processor circuit is to:

determine a resistance of the first via;

select a second via based on a determination that the resistance is greater than a threshold, the second via being a second instance of the multi-die via; and place and route the second via in parallel to the first via.

6. The apparatus of claim 1, wherein the multi-die via is a through dielectric via, the placement is a first placement, and one or more of the at least one processor circuit is to determine the first placement of the through dielectric via based on a second placement of a through silicon via on the second die.

7. The apparatus of claim 1, wherein the multi-die via is a through silicon via, the placement is a first placement, and one or more of the at least one processor circuit is to determine the first placement of the through silicon via based on a second placement of a through dielectric via on the second die.

8. At least one non-transitory computer readable storage medium comprising instructions to cause at least one processor circuit to at least:

obtain a register-transfer level design defining operations of electrical circuits in first and second dice of a multi-die semiconductor package, the second die to be stacked on the first die in the multi-die semiconductor package; and select placement of a cell for a physical layout for the multi-die semiconductor package based on the register-transfer level design, the cell a corresponding to a multi-die via, the multi-die via to electrically interconnect the first die to the second die.

9. The at least one non-transitory computer readable storage medium of claim 8, wherein the multi-die semiconductor package is to include a third die stacked between the first die and the second die, and the instructions cause one or more of the at least one processor circuit to select the placement of the cell to extend between the first die and the second die external to the third die, the multi-die via including a through mold via.

10. The at least one non-transitory computer readable storage medium of claim 8, wherein the multi-die semiconductor package is to include a third die stacked between the first die and the second die, and the instructions cause one or more of the at least one processor circuit to select the placement of the cell to extend through the third die, the multi-die via including a through silicon via.

11. The at least one non-transitory computer readable storage medium of claim 8, wherein the instructions cause one or more of the at least one processor circuit to:

determine characteristics of the cell;

determine characteristics of connected cells, the connected cells to be coupled to the cell; and select one or more additional cells based on a comparison of the characteristics of the cell and the characteristics of the connected cells.

12. The at least one non-transitory computer readable storage medium of claim 8, wherein the multi-die via is a first via and the instructions, when executed, cause one or more of the at least one processor circuit to:

determine a resistance of the first via;

select a second via based on a determination that the resistance is greater than a threshold, the second via being a second instance of the multi-die via; and place and route the second via in parallel to the first via.

13. The at least one non-transitory computer readable storage medium of claim 8, wherein the multi-die via is a through dielectric via, the placement is a first placement, and the instructions cause one or more of the at least one processor circuit to determine the first placement of the through dielectric via based on a second placement of a through silicon via on the second die.

14. The at least one non-transitory computer readable storage medium of claim 8, wherein the multi-die via is a through silicon via, the placement is a first placement, and the instructions cause one or more of the at least one processor circuit to determine the first placement of the through silicon via based on a second placement of a through dielectric via on the second die.

15. A method comprising:

obtaining, by electronic design automation circuitry, a register-transfer level design defining operations of electrical circuits in first and second dice of a multi-die semiconductor package, the second die to be stacked on the first die in the multi-die semiconductor package; and selecting, by electronic design automation circuitry, placement of a cell for a physical layout for the multi-die semiconductor package based on the register-transfer level design, the cell a corresponding to a multi-die via, the multi-die via to electrically interconnect the first die to the second die.

16. The method of claim 15, wherein the multi-die semiconductor package is to include a third die stacked between the first die and the second die, the method including selecting the placement of the cell to extend between the first die and the second die external to the third die, the multi-die via including a through mold via.

17. The method of claim 15, wherein the multi-die semiconductor package is to include a third die stacked between the first die and the second die, the method including selecting the placement of the cell to extend through the third die, the multi-die via including a through silicon via.

18. The method of claim 15, including:

determining characteristics of the cell;

determining characteristics of connected cells, the connected cells to be coupled to the cell; and selecting one or more additional cells based on a comparison of the characteristics of the cell and the characteristics of the connected cells.

19. The method of claim 15, wherein the multi-die via is a first via the method including:

determining a resistance of the first via;

selecting a second via based on a determination that the resistance is greater than a threshold, the second via being a second instance of the multi-die via; and placing and routing the second via in parallel to the first via.

20. The method of claim 15, wherein the multi-die via is a through dielectric via, the placement is a first placement, the method including determining the first placement of the through dielectric via based on a second placement of a through silicon via on the second die.

21. The method of claim 15, wherein the multi-die via is a through silicon via, the placement is a first placement, the method including determining the first placement of the through silicon via based on a second placement of a through dielectric via on the second die.

* * * * *